US009563692B1

(12) United States Patent
Haahr et al.

(10) Patent No.: US 9,563,692 B1
(45) Date of Patent: Feb. 7, 2017

(54) PROVIDING RESULT-BASED QUERY SUGGESTIONS

(71) Applicant: Google Inc., Mountain View, CA (US)

(72) Inventors: Paul Haahr, San Francisco, CA (US); Charles E. Martin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/696,020

(22) Filed: Apr. 24, 2015

Related U.S. Application Data

(63) Continuation of application No. 14/075,366, filed on Nov. 8, 2013, now Pat. No. 9,092,528, which is a continuation of application No. 12/871,515, filed on Aug. 30, 2010, now Pat. No. 8,583,675.

(60) Provisional application No. 61/238,033, filed on Aug. 28, 2009.

(51) Int. Cl.
 *G06F 17/30* (2006.01)

(52) U.S. Cl.
 CPC ..... *G06F 17/3064* (2013.01); *G06F 17/30648* (2013.01); *G06F 17/30864* (2013.01)

(58) Field of Classification Search
 CPC .................... G06F 17/30864; G06F 17/30867; G06F 17/30442
 USPC ................ 707/767, 769, 770, 736, 721, 723
 See application file for complete search history.

(56) References Cited

U.S. PATENT DOCUMENTS

| | | |
|---|---|---|
| 6,006,222 A | 12/1999 | Culliss |
| 6,014,665 A | 1/2000 | Culliss |
| 6,078,916 A | 6/2000 | Culliss |
| 6,182,068 B1 | 1/2001 | Culiss |
| 6,539,377 B1 | 3/2003 | Culiss |
| 6,816,850 B2 | 11/2004 | Culiss |
| 7,725,485 B1 | 5/2010 | Sahami et al. |
| 7,844,599 B2 | 11/2010 | Kasperski et al. |
| 7,921,107 B2 | 4/2011 | Chang et al. |
| 7,984,004 B2 | 7/2011 | Andrew et al. |
| 8,065,316 B1 | 11/2011 | Baker et al. |
| 8,122,011 B1 | 2/2012 | Garg et al. |
| 8,412,727 B1 | 4/2013 | Das et al. |

(Continued)

OTHER PUBLICATIONS

Joachims, "Evaluating Search Engines Using Clickthrough Data", Cornell University, Department of Computer Science, Draft, Feb. 19, 2002, 13 pages.

(Continued)

*Primary Examiner* — Shahid Alam
(74) *Attorney, Agent, or Firm* — Fish & Richardson P.C.

(57) ABSTRACT

In general, one aspect of the subject matter described can be embodied in a method that includes, obtaining a plurality of search results responsive to an initial search query, the search results including a first search result that identifies a first resource; determining, using a document-to-query-to-document model, that the first resource is relevant to a first suggested query different from the initial search query; generating a presentation of the search results responsive to the initial search query; and providing the presentation of the search results in response to the initial search query. Each search result in the presentation includes a link to a respective resource, wherein the first search result in the presentation includes a link that, upon a selection by a user, can cause the first suggested query to be submitted to a search engine.

17 Claims, 14 Drawing Sheets

(56) References Cited

U.S. PATENT DOCUMENTS

| | | |
|---|---|---|
| 8,583,675 B1 | 11/2013 | Haahr et al. |
| 8,918,417 B1 | 12/2014 | Das et al. |
| 8,930,350 B1 | 1/2015 | Herscovici et al. |
| 2004/0186827 A1 | 9/2004 | Anick et al. |
| 2005/0283468 A1 | 12/2005 | Kamvar et al. |
| 2006/0010126 A1 | 1/2006 | Anick et al. |
| 2006/0026147 A1 | 2/2006 | Cone et al. |
| 2006/0047649 A1 | 3/2006 | Liang |
| 2006/0230005 A1 | 10/2006 | Bailey |
| 2006/0230022 A1 | 10/2006 | Bailey |
| 2006/0230035 A1 | 10/2006 | Bailey |
| 2007/0050351 A1 | 3/2007 | Kasperski et al. |
| 2008/0091670 A1 | 4/2008 | Ismalon |
| 2008/0189269 A1 | 8/2008 | Olsen |
| 2009/0119248 A1 | 5/2009 | Sundaresan et al. |
| 2009/0119261 A1 | 5/2009 | Ismalon |
| 2009/0248510 A1* | 10/2009 | Ahluwalia .......... G06F 17/3064 705/14.54 |
| 2009/0292700 A1 | 11/2009 | Castellani |
| 2010/0114929 A1 | 5/2010 | Bonchi et al. |
| 2010/0185644 A1 | 7/2010 | Gutt et al. |
| 2010/0211588 A1 | 8/2010 | Jiang et al. |
| 2011/0238608 A1 | 9/2011 | Sathish |

OTHER PUBLICATIONS

Joachims; Optimizing search engines using clickthrough data; 2002; Proceedings of the ACM SIGKDD International Conference on Knowledge Discovery and Data Mining, p. 133-142, 10 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

* cited by examiner

PROVIDING RESULT-BASED QUERY SUGGESTIONS

CROSS-REFERENCE TO RELATED APPLICATIONS

This application is a continuation of U.S. patent application Ser. No. 14/075,366, filed on Nov. 8, 2013, entitled "Providing Result-Based Query Suggestions," which is a continuation of U.S. patent application Ser. No. 12/871,515, now U.S. Pat. No. 8,583,675, filed on Aug. 30, 2010, entitled "Providing Result-Based Query Suggestions," which claims priority to U.S. Provisional Patent Application No. 61/238,033, filed on Aug. 28, 2009, entitled "Providing Result-Based Query Suggestions." All above mentioned patents and patent applications are hereby incorporated by reference in their entireties.

BACKGROUND

The present disclosure relates to providing search results and suggested queries.

Internet search engines typically operate by storing information about many web pages, which they retrieve from the World Wide Web (WWW) using a Web crawler that follows hyperlinks on pages it encounters. The contents of each page are typically analyzed to determine how the page should be indexed (for example, words are extracted from the titles, headings, or special fields called meta tags). Data about web pages are stored in an index database for use in later queries. When a user enters a query into a search engine, the search engine examines its index and provides a listing of best-matching web pages according to its criteria, usually with a short summary containing the document's title and sometimes parts of the text. The usefulness of a search engine depends on the relevance of the result set it gives back. While there may be millions of web pages that include a particular word or phrase, some pages may be more relevant, popular, or authoritative than others. Most search engines employ techniques to rank the results to provide the "best" results first.

SUMMARY

In general, one aspect of the subject matter described in this specification can be embodied in a method that includes, for a first document that is included in first search results responsive to a first user-submitted query, selecting a plurality of previously submitted queries for which the first document was a responsive search result. The method can further include, for each of the selected previously submitted queries, determining whether second documents that are relevant to the previously submitted query have at least a threshold level of result diversity in comparison to the first search results, wherein second documents are determined to be relevant to the previously submitted query based on data that is indicative of user behavior relative to the second documents as search results for the previously submitted query. The method can additionally include, based on the determination of whether the second documents have at least a threshold level of result diversity in comparison to the first search results, identifying one or more queries from the selected previously submitted queries to provide as first suggested queries; and providing the one or more identified queries as first suggested queries with the first search results for the first user-submitted query.

These and other embodiments can optionally include one or more of the following features. The first document can be associated with data for each of the selected previously submitted queries, where the data can be indicative of user behavior relative to the first document as a search result for the selected previously submitted queries. The selected previously submitted queries can be selected using a document-to-query-to-document model that associates the first document to the plurality of previously submitted queries and that associates each of the plurality of previously submitted queries to one or more of the second documents for which each of the one or more second documents was a responsive search result. Associations between the first document, the plurality of previously submitted queries, and the second documents of the document-to-query-to-document model can be derived from data that is indicative of user behavior relative to the first document and the second documents as search results for the plurality of previously submitted queries. The method for providing one or more first suggested queries can further include receiving a request to create the document-to-query-to-document model; for each of the plurality of previously submitted queries, creating a query-to-document model that relates the previously submitted query to the one or more of the second documents for which each of the one or more second documents was a responsive search result; and for each of the second documents, associating the second document to each created query-to-document model within which the second document is related to one of the plurality of previously submitted queries to create the document-to-query-to-document. Receiving, creating, and associating can be performed at a time prior to receiving the first user-submitted query.

The method for providing one or more first suggested queries can additionally include creating a selectable user-interface for the first suggested queries to be presented as part of the first search results for the first user-submitted query. For each of the first suggested queries, selection of the selectable user-interface for the suggested query can cause the suggested query to be submitted as a second user-submitted query. The method for providing one or more first suggested queries can further include providing second search results that are responsive to the second user-submitted query that are different than the first search results responsive to the first user-submitted query. The method for providing one or more first suggested queries can additionally include providing second suggested queries with the second search results that each include one or more terms that do not occur in the second user-submitted query, and wherein search results responsive to the second suggested queries are different from the second search results.

Particular embodiments of the invention can be implemented to realize one or more of the following advantages. Suggested queries are provided with results in a manner that permit a user to readily locate results that are related, yet diverse from the provided results. By suggesting queries, a user is able to browse to these related, yet diverse results without having to attempt additional query terms in a trial and error fashion—the suggested queries take the guess work out of locating related results. The suggested queries permit greater breadth of exploration of electronic resources by illuminating additional topics to a user. The use of the described document-to-query-to-document (D-Q-D) model permits for diverse queries that produce diverse results to be quickly and efficiently located. Creation of D-Q-D models offline increases the speed with which suggested queries are served. Furthermore, creation of trimmed-down D-Q-D models permits for storage space to be conserved while maintaining pertinent relationships between queries and documents that are used to identify suggested queries.

Suggested queries can also serve as a form of documentation, summarization, tagging, and keywording for their associated results, and may aid the user in more rapidly identifying the relevant result on the original search results page even if the user does not click further on a suggested query link. Suggested queries may also differ radically from the original query, which can provide a user with a greater breadth of related material. For example, the query "green" can result in suggested queries "rosa clemente" and "bisphenol a," neither of which would be likely appear as results of adding query terms to the query "green." These suggested queries can be provided based on "Rosa Clemente," who was the Green Party candidate for President in 2008, being suggested as a related query for a result pertaining to the Green Party of the United States Homepage, and "bisphenol a" being suggested as a related query for a result pertaining to the "Green Guide for Everyday Living", which discusses the use of bisphenol a in plastic containers. These suggested queries can be more diverse than queries that may be suggested using a query-to-query suggestion model.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
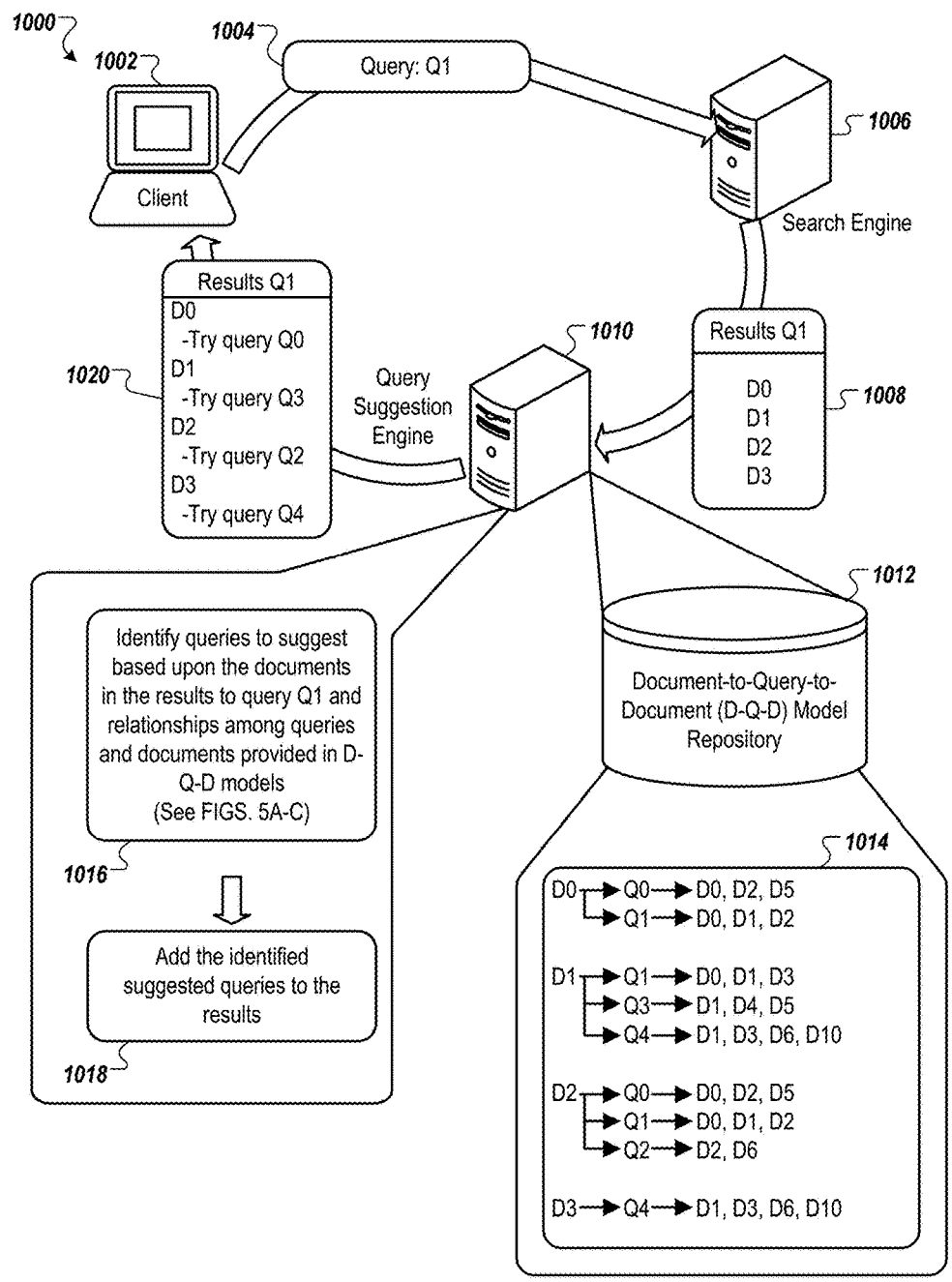
FIG. 1A shows a diagram illustrating an example of providing suggestions for alternate queries to a received input query.

FIG. 1A shows a diagram 1000 illustrating an example of providing suggestions for alternate queries to a received input query. As explained in further detail below, the suggested queries can be identified based upon the documents listed in results produced in response to the input query by a search engine.

Often times a user viewing results produced by a search engine will want to explore documents (e.g., web pages) for topics related to the input query, similar to perusing the stacks in a library for related resources. Using a library as an analogy, a person can search a library's catalog and receive a list of books physically located in the library for the topic being searched. Given the topic-oriented organization of books in a library (e.g., books regarding similar topics are located near each other), books for topics related to the searched topic can be readily explored by simply scanning the shelves around a book identified in response to the search. Such exploration of related books does not require knowledge of the topics to which these related books pertain. Instead, related books can be uncovered by simply knowing a shelf in the library where a book identified by a search is located.

For example, a person searching a library catalog for a book related to "baking cakes" can receive results that include a book entitled Baking Cakes. When retrieving the book Baking Cakes from the library stacks, the person can discover books for other topics that are related to "baking cakes," such as a book entitled Baking Pies. This related book can be discovered without the person having to run an additional search, such as "baking pies," that would produce the book Baking Pies as a result. Instead, the person is able to use the result Baking Cakes to locate a similar result (e.g., Baking Pies) that pertains to a different topic (e.g., "baking pies") than the topic of the initial search (e.g., "baking cakes").

Given the voluminous and frequently changing nature of electronic resources (e.g., web pages, images, videos, news feeds, blogs, etc.), it can be difficult to provide a useful interface for exploring related electronic documents in a fashion similar to exploring related books in a library. The suggested queries presented in the diagram 1000 provide such an interface for result-oriented document exploration. As described in greater detail below, each of the suggested queries is associated with a document and produces results that are related to the associated document. Referring back to the library example above, if a searching a library catalog is analogous to an input query and a book identified by the search is analogous to a document listed in the results to the input query, then a suggested query for the document is analogous to a topic for books located in the library near the identified book and documents listed in results produced by executing the suggested query are analogous to the other, related books located near the identified book.

For example, assume a user submits a query for "baking cakes" to a search engine and that the web page "www.bake-cakes.com" appears as one of the documents listed in the results for the query. Assume further that the query "baking pies" is provided in the results as a suggested query for the document "www.bake-cakes.com." By selecting and submitting the suggested query "baking pies" to the search engine, the user can receive results containing documents that are distinct (e.g., documents not contained in the results to the input query) yet related to the web page "www.bake-cakes.com." For instance, the results for the suggested query "baking pies" can contain a document "www.baking-pies.com" related to "www.bake-cakes.com" which was not contained in the results for the originally submitted query "baking cakes."

Suggested search queries can be diverse and bear little to no resemblance to the original query. For example, the query "green" can result in suggested queries "rosa clemente" and "bisphenol a," neither of which includes the term "green" or which would likely result from adding terms to the query "green." These suggested queries can be provided based on "Rosa Clemente," who was the Green Party candidate for President in 2008, being suggested as a related query for a result pertaining to the Green Party of the United States Homepage, and "bisphenol a" being suggested as a related query for a result pertaining to the "Green Guide for Everyday Living", which discusses the use of bisphenol a in plastic containers.

In various implementations, a client 1002 submits an input query 1004 (Q1) to a search engine 1006 and the search engine 1006 returns results for the query 1004 to the client 1002. The client 1002 and the search engine 1006 are computing devices, such as a desktop computer, a server system, a laptop computer, a mobile computing device (e.g., a cell phone, a PDA, etc.), a gaming console, etc. The search engine 1006 produces results 1008 that are an ordered list of documents (D0-D3) determined to be responsive to the input query 1004, with the most relevant documents being provided at the top of the list. The search engine 1006 determines relevance based, at least in part, on document content. In the depicted example, the results 1008 are an ordered list of documents D0-D3. Such an ordering can indicate that the document D0 has been determined to be more relevant to the query Q1 than the document D3. For example, if the query Q1 is "President of the United States," then the document D0 can be an official web page for the President and the document D3 can be a news article discussing a recent speech delivered by the President.

The diagram 1000 shows an example framework for providing suggested queries for the results 1008 through the use of a query suggestion engine 1010. The query suggestion engine 1010 is a computing device, such as a server system, a desktop computer, a portable computing device, a distributed computing device, etc. The query suggestion engine 1010 determines suggested queries based upon the results 1008 and relationships between documents and queries. A variety of techniques can be used to efficiently model document and query relationships for use by the query suggestion engine 1010, such as tables, hashes, trees, etc. In the example depicted in the diagram 1000, document-to-query-to-document (D-Q-D) models that are stored in a D-Q-D repository 1012 are used by the query suggestion engine 1010 to determine suggested queries. A simplified D-Q-D model 1014 is provided for illustrative purposes. Using the D-Q-D model 1014, related documents can be identified through query to document relationships. For instance, the document D0 is depicted as being related to query Q0, and the query Q0 is shown as being related to documents D0, D2, and D5. Based on these depicted relationships between queries and documents, the document D0 is related to the documents D2 and D5. To direct a user to the related documents D2 and D5 (e.g., to illuminate related sources of information that pertain to a topic different than Q1), the query suggestion engine 1010 can provide the query Q0 as a suggested query for document D0.

The relationships depicted in the D-Q-D model 1014 can be based on variety of factors, such as whether a document appears the results for a query, whether a document appears in the top N (e.g., 10, 25, 50, 100, 1000, etc.) results for a query, whether users find a document to be relevant to a query when the document is presented in the results for the query (e.g., do users frequently select the document when it is listed in the results for the query?), etc. Whether users find a document to be relevant to a query can be determined from user behavior data and quality of result statistics derived from user behavior data. In general, user behavior data is a collection of user reactions to a document as a result to a particular query (e.g., how frequently do users select the document, how long do users view the document before submitting a subsequent query, etc.). Some user reactions indicate a document is relevant to a query (e.g., users frequently select the document when it is presented in the results) and some user reactions indicate the document is not relevant to the query (e.g., users infrequently select the document when it is presented in the results). User behavior data is anonymized so that user identities cannot be detected and so that user privacy is protected.

Although the relevance of a query to a document is described as being based on a query having been associated with a document through an actual user query and search results page (e.g., user behavior data), other information sources can be used (in whole or in part) to determine query to document relevance.

One example of user behavior data is "click data." Click data refers to how long a user views or "dwells" on a document after clicking on it in the results for a query. For example, a longer time spent dwelling on a document, termed a "long click", can indicate that a user found the document to be relevant for their query. A brief period viewing a document, termed a "short click", can be interpreted as a lack of document relevance. Another type of user behavior data is based on tracking eye movements of users as they view search results. Other types of user behavior data are possible. In various implementations, the click data is a count of each click type (e.g., long, medium, short) for a document listed as a result for particular input query (a query previously submitted to the search engine 1006) and document combination.

In various implementations and by way of illustration, user behavior data is generated by a process that creates a record for documents that are selected by users in response to a specific query. Each record (herein referred to as a tuple: <document, query, data>) comprises a query submitted by users, a document reference indicating the document selected by users in response to the query, and an aggregation of click data for all users or a subset of all users that selected the document reference in response to the query. In some implementations, extensions of this tuple-based approach to user behavior data are possible. For instance, the user behavior data can be extended to include location-specific (e.g. country, state, etc) or language-specific identifier. With such identifiers included, a country-specific tuple would include the country from where the user query originated from in whereas a language-specific tuple would include the language of the user query.

Another example of user behavior data is purchase decision data. Such user behavior data can be based on, for example, products searched for by consumers, products viewed by consumers, details regarding the viewing of products, and products purchased by consumers.

A quality of result statistic for a document is derived from user behavior data associated with the document. User behavior data, such as click data, for a query and a given document can be used to create a quality of result statistic for that document as a result to the query. By way of illustration, a quality of result statistic can be a weighted average of the count of long clicks for a given document and query. Other ways of determining a quality of result statistic for a document are possible. The relationships for the D-Q-D model 1014 can be based, at least in part, on quality of result statistics for a document as a result of a query that indicate the document is relevant to the query.

Creation of D-Q-D models, such as the D-Q-D model 1014, are described below in more detail with regard to FIG. 1B.

The query suggestion engine 1010 uses the D-Q-D model 1014 to identify queries to suggest for each of the documents listed in the results 1008 (step 1016). In general, for each document in the results 1008 the query suggestion engine 1010 uses the D-Q-D model 1014 to identify another related and diverse document (e.g., a document not contained in the results 1008). The query that connects the document from the results 1008 and the related and diverse document in the D-Q-D model 1014 can be selected as a suggested query for the document from the results 1008. Multiple suggested queries can be presented for each document in the results 1008. In various implementations, the suggested queries are diverse as well—meaning that each of the suggested queries is different than the input query 1004 and the other suggested queries. Query diversity can be determined using a variety of techniques. In various implementations, a suggested query is diverse if it contains at least one diverse term. In some implementations, a suggested query is diverse if every term in the query is diverse. Terms can be evaluated for diversity as unigrams (one term), bigrams (two terms), trigrams (three terms), etc.

By way of illustration, queries Q0, Q3, Q2, and Q4 are selected by the query suggestion engine 1010 as suggested queries for the documents D0-D3, respectively, from the results 1008 using the example D-Q-D model 1014. In this example, all of the queries Q0-Q4 are considered to be diverse and one suggested query is selected for each document. For the document D0, the query Q0 is selected based upon the document D5 being diverse to the query results 1008 (D0-D3) and related to D0 in the D-Q-D model 1014 through the query Q0. For the document D1, the query Q3 is selected based upon the document D4 being diverse to the query results 1008 (D0-D3) and results for the other suggested queries (D5 for suggested query Q0), and based upon D4 being related to D1 in the D-Q-D model 1014 through the query Q3. The query Q1 is not selected for document D1 since Q1 is the input query 1004. For the document D2, the query Q2 is selected based upon the document D6 being diverse to the query results 1008 (D0-D3) and results for the other suggested queries (D5 for suggested query Q0 and D4 for the suggested query Q3), and based upon D6 being related to D2 in the D-Q-D model 1014 through the query Q2. The query Q0 is not selected for document D6 because it is already used as a suggested query for document D0 and the query Q1 is not selected since it is the input query 1004. For the document D3, the query Q4 is selected based upon the document D10 being diverse to the query results 1008 (D0-D3) and results for the other suggested queries (D5 for suggested query Q0, D4 for the suggested query Q3, and D6 for the suggested query Q2), and based upon D10 being related to D3 in the D-Q-D model 1014 through the query Q3.

With the suggested queries identified for each of the documents in the results 1008, the query suggestion engine 1010 adds the identified queries to the results (step 1018). The suggested queries can be added to the results 1008 in a selectable format (e.g., a hyperlink) such that a user selecting the suggested query will cause the client 1002 to submit the suggested query (like query 1004) to the search engine 1006 for execution. In some implementations, the suggested queries are added to the results 1008 as metadata that a user can view and select by performing a designated action (e.g., right-clicking on a document in the results to provide a drop-down list of selectable suggested queries, shaking a mobile phone presenting the results to receive a display of selectable suggested queries, etc.). By way of illustration, results 1020 include the results 1008 from the search engine 1006 with suggested queries identified by the query suggestion engine 1010 added for each document. With the results 1020 containing the suggested queries created, the query suggestion engine 1010 provides the results 1020 to the client 1002 (e.g., transmits the results 1020 to the client 1002 over a network, queues the results 1020 in a repository for retrieval by the client 1002, etc.). The cycle of submitting a query and receiving results that contain suggested queries depicted in the diagram 1000 can then proceed for each of the suggested queries in the results 1020.

Figure 1B:
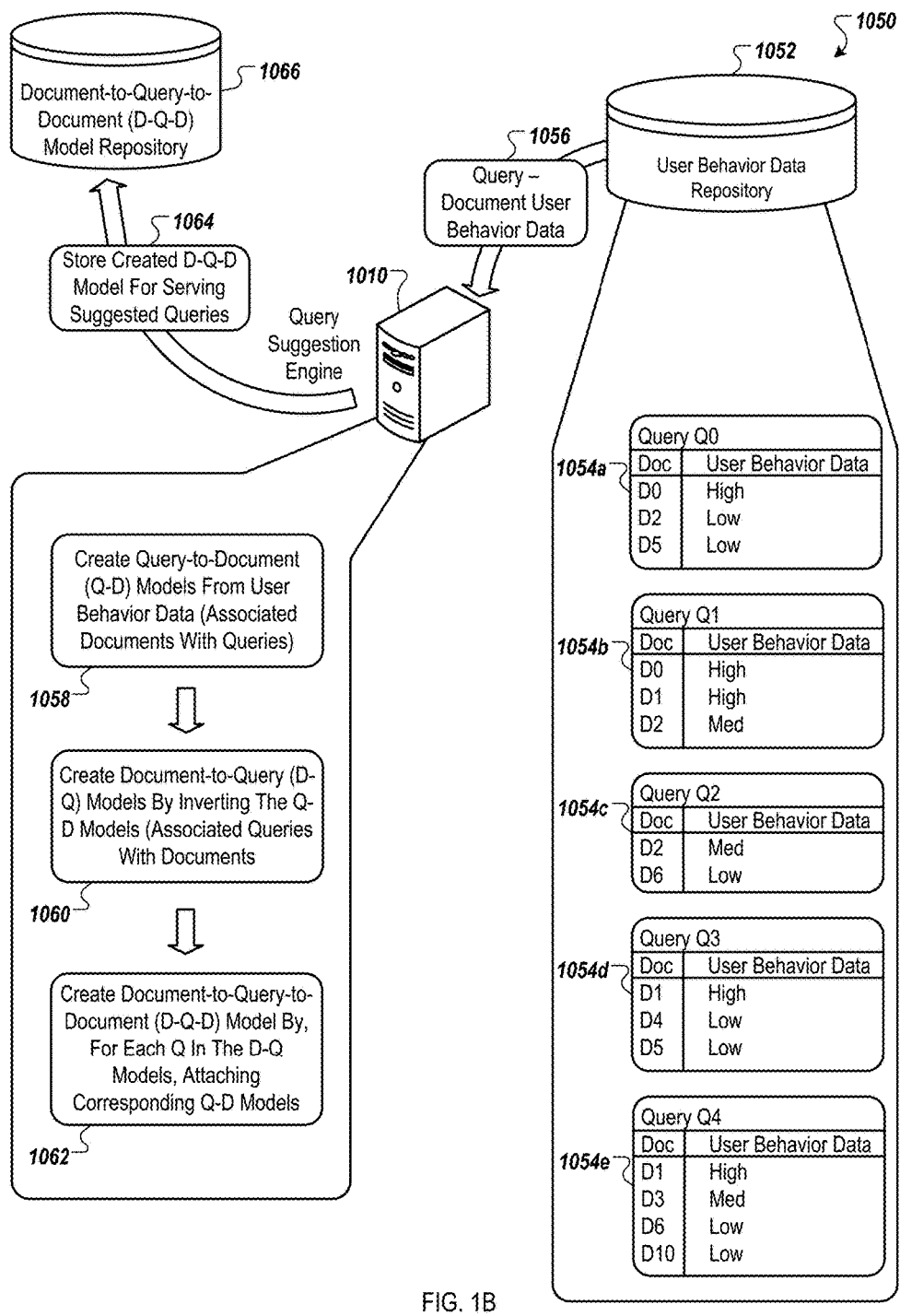
FIG. 1B shows a diagram illustrating an example of creating a D-Q-D model for use in providing suggestions for alternate queries to a received input query.

FIG. 1B shows a diagram 1050 illustrating an example of creating a D-Q-D model for use in providing suggestions for alternate queries to a received input query. The diagram 1050 depicts the query suggestion engine 1010 as being capable of creating a D-Q-D model, such as the D-Q-D model 1014 described above with regard to FIG. 1A. In the example depicted, the query suggestion engine 1010 produces D-Q-D models based upon user behavior data. As explained above with regard to FIG. 1A, D-Q-D models can be created based upon other information or data demonstrating query to document relationships. The query suggestion engine 1010 can create and update a D-Q-D model at various times, such as at a time prior to receiving an input query (e.g., the query 1004), in response to receiving an input query, etc.

The query suggestion engine 1010 creates D-Q-D models using user behavior data and/or quality of result statistics stored in a user behavior data repository 1052. The user behavior data repository 1052 can be a data repository (e.g., a database, a file system, etc.) that is communicatively connected to the query suggestion engine 1010 (e.g., coupled to the query suggestion engine 1010, in communication with the query suggestion engine 1010 over a network, etc.). The user behavior data repository 1052 stores user behavior data 1054a-e for queries Q0-Q4, respectively. The user behavior data 1054a-e provides an indication of how users have reacted with regard to various documents being presented as results for the queries Q0-Q4. For simplicity of presentation, the user behavior data 1054a-e for each query-document pair is depicted as being a "high," "medium," or "low" amount of favorable user behavior data. Favorable user behavior data is user behavior data that indicates the document from a query-document pair is relevant to the query, such as users frequently selecting the document when it is presented in results for the query.

For example, the user behavior data 1054a for query Q0 indicates that users have found document D0 to be the most relevant document to the query Q0. In another example, the user behavior data 1054c for query Q2 indicates that users have found document D2 to be the most relevant of the documents produced in results for the query Q2, but that the users have not found any of the documents to be highly relevant to the query Q2.

The query suggestion engine 1010 receives query-document user behavior data from the user behavior data repository 1052 (step 1056). The query suggestion engine 1010 begins creating a D-Q-D model by creating query-to-document (Q-D) models for each of the queries for which user behavior data was received from the user behavior data repository 1052 (step 1058). Given the user behavior data 1054a-e, Q-D models are created for the queries Q0-Q4. As an example, using the user behavior data 1054a, a Q-D model is created that associates the documents D0, D2, and D5 with the query Q0. Various filtering can be performed on the queries and documents contained in the Q-D models, as described in further detail below with regard to FIGS. 4A-B. Additionally, the documents in each Q-D model can be sorted according to each document's relevance to the associated query. For example, regarding the Q-D model for the query Q0, the query suggestion engine 1010 will sort the documents D0 as the most relevant document and D5 as the least relevant document.

The query suggestion engine 1010 then creates document-to-query (D-Q) models from the created Q-D models by inverting the Q-D models (step 1060). Inverting a Q-D model involves associating queries with documents (instead of associating documents with queries, as presented in a Q-D model). For instance, a D-Q model created for document D0 will associate queries Q0 and Q1 with the document D0. The document D0 will be included in the Q-D models for both queries Q0 and Q1, as indicated by the user behavior data 1054a-b for queries Q0 and Q1. Various filtering can be performed on the documents and associated queries contained in the D-Q models, as described in further detail below with regard to FIGS. 4A-B The query suggestion engine 1010 creates a D-Q-D model by, for each query in the D-Q models, attaching the corresponding Q-D model (step 1062). For instance, given the D-Q model for document D0 includes the queries Q0 and Q1, the Q-D models for queries Q0 and Q1 will be attached to the D-Q model for document D0 to form a D-Q-D model. The created D-Q-D models are then stored in the D-Q-D model repository 1012 for future use when serving an input query (step 1064). In implementations where the D-Q-D model is created or updated when serving an input query (e.g., determining suggested queries for the query), the created/updated D-Q-D model is used by the query suggestion engine 1010 to identify suggested queries for results to a received input query. The example D-Q-D model 1014 as described above with regard to FIG. 1A can be created by the query suggestion engine 1010 based upon the user behavior data 1054a-e.

Figure 2:
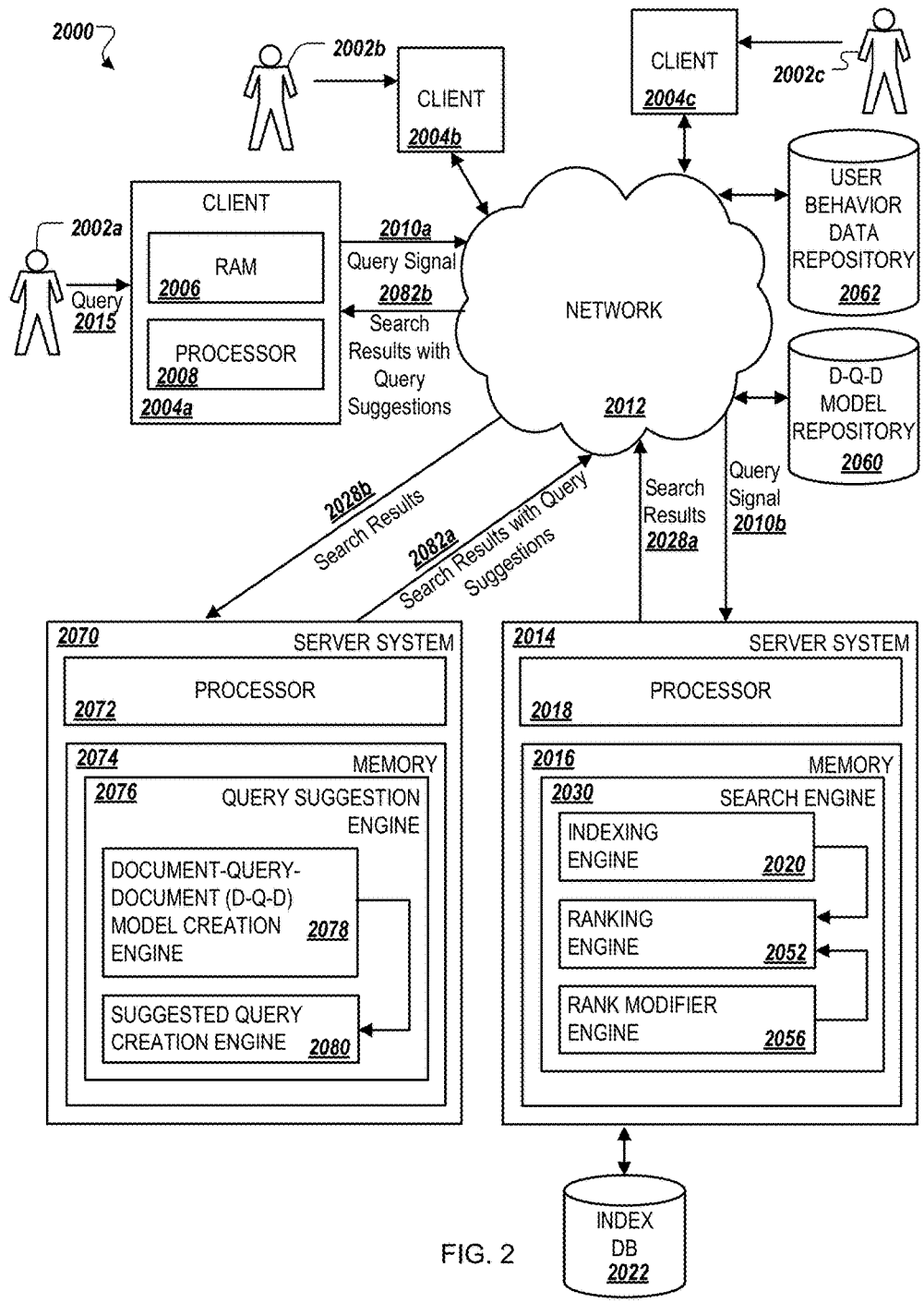
FIG. 2 shows an example system for providing suggested queries with results obtained in response to submitted search queries, as can be implemented for the Internet, an intranet, or other client/server environment.

FIG. 2 shows an example system 2000 for providing suggested queries with results obtained in response to submitted search queries, as can be implemented for the Internet, an intranet, or other client/server environment. The system 2000 is an example of an information retrieval system in which the systems, components and techniques described below can be implemented. Although several components are illustrated, there may be fewer or more components in the system 2000. Moreover, the components can be distributed on one or more computing devices connected by one or more networks or other suitable communication mediums.

A user 2002 (2002a, 2002b, 2002c) can interact with the system 2000 through a client device 2004 (2004a, 2004b, 2004c) or other device. For example, the client device 2004 can be a computer terminal within a local area network (LAN) or wide area network (WAN). In another example, the client device 2004 can be a mobile device (e.g., a mobile phone, a mobile computer, a personal desktop assistant, etc.) that is capable of communicating over a LAN, a WAN, or some other network (e.g., a cellular phone network). The client device 2004 can include a random access memory (RAM) 2006 (or other memory and/or a storage device) and a processor 2008. The processor 2008 is structured to process instructions within the system 2000. In some implementations, the processor 2008 is a single-threaded or multi-threaded processor having one or more processing cores.

The processor 2008 is structured to execute instructions stored in the RAM 2006 (or other memory and/or a storage device included with the client device 2004) to display graphical information for a user interface.

A user 2002a can connect to a search engine 2030 within a server system 2014 to submit an input query 2015. When the user 2002a submits the input query 2015 through an input device attached to a client device 2004a, a client-side query signal 2010a is sent into a network 2012 and is forwarded to the server system 2014 as a server-side query signal 2010b. Server system 2014 can be one or more server devices in one or more locations. A server device 2014 includes a memory device 2016, which can include the search engine 2030 loaded therein. A processor 2018 is structured to process instructions within the device 2014. These instructions can implement one or more components of the search engine 2030. The processor 2018 can be a single-threaded processor or a multi-threaded processor, and can include multiple processing cores. The processor 2018 can process instructions stored in the memory 2016 related to the search engine 2030 and can send information to the client device 2004, through the network 2012, to create a graphical presentation in a user interface of the client device 2004 (e.g., a search results web page displayed in a web browser).

The server-side query signal 2010b is received by the search engine 2030. The search engine 2030 uses the information within the input query 2015 (e.g. query terms) to find relevant documents. The search engine 2030 can include an indexing engine 2020 that actively searches a corpus (e.g., web pages on the Internet) to index the documents found in that corpus, and the index information for the documents in the corpus can be stored in an index database 2022. This index database 2022 can be accessed to identify documents related to the user query 2015. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The search engine 2030 can include a ranking engine 2052 to rank the documents related to the input query 2015. The ranking of the documents can be performed using traditional techniques for determining an IR score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. Such an inference can be made based upon the general presumption that authors of pointing documents point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be taken to identify and eliminate attempts to cast false votes so as to artificially drive up the relevance of a page.

To further improve such traditional document ranking techniques, the ranking engine 2052 can receive an additional signal from a rank modifier engine 2056 to assist in determining an appropriate ranking for the documents. The rank modifier engine 2056 provides one or more measures of relevance for the documents, which can be used by the ranking engine 2052 to improve the search results' ranking provided to the user 2002. The rank modifier engine 2056 can perform one or more of the operations based upon document relevance with regard to the input query 2015 as indicated by user behavior data and/or quality of result statistics, similar to the user behavior data and quality of result statistics described above with regard to FIGS. 1A-B. User behavior data stored in a user behavior data repository 2060 is accessed over the network 2012 by the server system 2014 for use by the rank modifier engine 2056.

The search engine 2030 can forward the final, ranked result list within a server-side search results signal 2028a through the network 2012. Exiting the network 2012, a search results signal 2028b can be received by a server system 2070 that is configured to provide suggested queries for the results determined by the search engine 2030. Server system 2070 can be one or more server devices in one or more locations. A server device 2070 includes a memory device 2072, which can include a query suggestion engine 2076 loaded therein. A processor 2072 is structured to process instructions within the device 2070. These instructions can implement one or more components of the query suggestion engine 2076. The processor 2072 can be a single-threaded processor or a multi-threaded processor, and can include multiple processing cores. The processor 2072 can process instructions stored in the memory 2074 related to the query suggestion engine 2076 and can send information to the client device 2004, through the network 2012, to create a graphical presentation in a user interface of the client device 2004 (e.g., a search results web page displayed in a web browser). In some implementations, the server system 2070 is part of the server system 2014.

In some implementations, the query suggestion engine 2076 can operate in parallel on a per-result basis using a distributed version of a D-Q-D model. For example, the query suggestion engine 2076 can use a separate, parallel operation for each the results for a search query to determine one or more suggested search queries for each result. The suggested search queries determined from the parallel operations can then be merged together, filtered, and provided with the search results. The parallel operations can be performed with the original search by the search engine 2030 or separately from the original search.

The query suggestion engine 2076 includes a document-to-query-to-document (D-Q-D) model creation engine 2078 and a suggested query creation engine 2080. The D-Q-D model creation engine 2078 can create a D-Q-D model using information that relates documents to queries in terms of relevance (e.g., user behavior data, quality of result statistics, an IR score, etc.). For example, the D-Q-D model creation engine 2078 can create a D-Q-D model using based upon user behavior data, similar to the creation of a D-Q-D model by the query suggestion engine 1010 described above with regard to FIG. 1B. The D-Q-D model creation engine 2078 can create a D-Q-D model in an off-line process (e.g., not in response to the search results 2028b) or in an on-line process (e.g., in response to the query suggestion engine 2076 receiving the search results 2028b). The D-Q-D model creation engine 2076 can store a created or updated D-Q-D model in a D-Q-D model repository 2062 that is in communication with the server system 2070 through the network 2012.

Using a D-Q-D model from the D-Q-D model creation engine 2078 (or from the D-Q-D model repository 2062), the suggested query creation engine 2080 identifies suggested queries to be added to the received search results signal 2028b. The suggested query creation engine 2080 can perform one or more operations to identify at least one suggested query for each of the received results 2028b using techniques similar to those described above with regard to the query suggestion engine 1010 with respect to FIG. 1A and below with regard to FIGS. 5A-C and 7A-B. The suggested query creation engine 2080 can provide ranked results with suggested queries within a server-side search results signal 2082a. Exiting the network 2012, a client-side search results signal 2082b can be received by the client device 2004a where the results can be stored within the RAM 2006 and/or used by the processor 2008 to display the results on an output device for the user 2002a.

Figure 3:
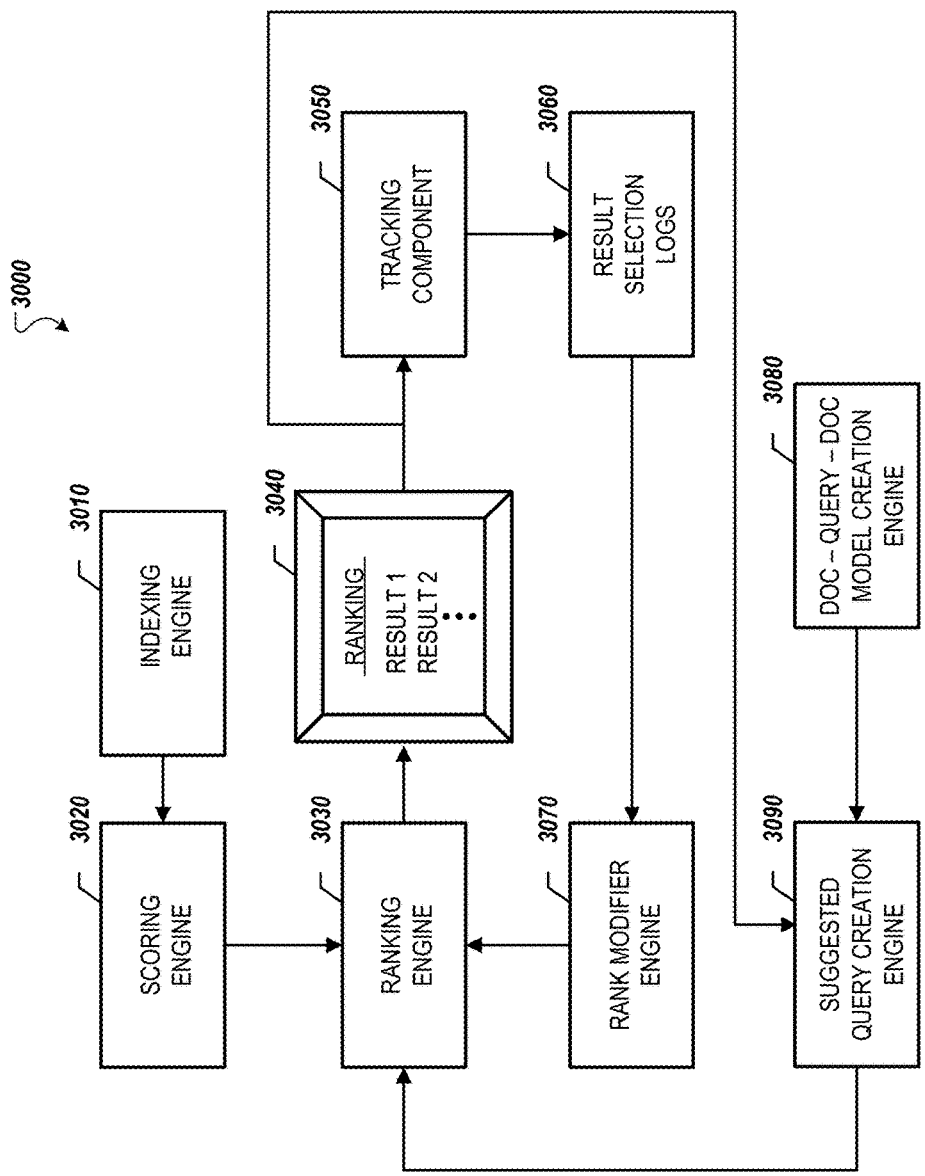
FIG. 3 shows example components of an information retrieval system.

FIG. 3 shows example components of an information retrieval system 3000. These components can include an indexing engine 3010, a scoring engine 3020, a ranking engine 3030, a rank modifier engine 3070, a document-to-query-to-document (D-Q-D) model creation engine 3080, and a suggested query creation engine 3090. The indexing engine 3010 can function as described above for the indexing engine 2020. The rank modifier engine 3070 can function as described above with regard to the rank modifier engine 2056. The D-Q-D model creation engine 3080 and the suggested query creation engine 3090 can function as described above with regard to the D-Q-D model creation engine 2078 and the suggested query creation engine 2080, respectively. In addition, the scoring engine 3020 can generate scores for document results based on many different features, including content-based features that link a query to document results, and query-independent features that generally indicate the quality of documents results. The content-based features can include aspects of document format, such as query matches to title or anchor text in an HTML (Hyper Text Markup Language) page. The query-independent features can include aspects of document cross-referencing. Moreover, the particular functions used by the scoring engine 3020 can be tuned, to adjust the various feature contributions to the final IR score, using automatic or semi-automatic processes.

The ranking engine 3030 can produce a ranking of document results 3040 for display to a user based on IR scores received from the scoring engine 3020 and one or more signals from the rank modifier engine 3070. A tracking component 3050 can be used to record information regarding user behavior such as individual user selections of the results presented in the ranking 3040. For example, the tracking component 3050 can be embedded JavaScript code included in a web page ranking 3040 that identifies user selections (e.g., mouse clicks) of individual document results and also identifies when the user returns to the results page, thus indicating the amount of time the user spent viewing the selected document result. In other implementations, the tracking component 3050 is proxy system through which user selections of the document results are routed, or the tracking component can include pre-installed software at the client. Other implementations are also possible, such as by using a feature of a web browser that allows a tag/directive to be included in a page, which requests the browser to connect back to the server with message(s) regarding link(s) clicked by the user.

The recorded information can be stored in result selection logs 3060. The recorded information can include log entries that indicate, for each user selection, the query (Q), the document (D), the user's dwell time (T) on the document, the language (L) employed by the user, and the country (C) where the user is likely located (e.g., based on the server used to access the IR system). Other information indicative of user behavior can also be recorded, such as user interactions with a presented ranking, including negative information, such as the fact that a document result was presented to a user, but was not clicked, position(s) of click(s) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, etc.

In various implementations, the time (T), also known as "click data", is measured as the time between the initial click through to the document result until the time the user comes back to the main page and clicks on another document result. In general, an assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The information retrieval system 3000 can additionally include the D-Q-D model creation engine 3080 that models document relatedness through queries, similar to the D-Q-D models described above with regard to FIGS. 1A-B. The D-Q-D model creation engine 3080 creates D-Q-D models based upon information indicating which documents are relevant to which queries, such as user behavior data, quality of result statistics, IR scores, etc. For example, the D-Q-D model creation engine 3080 can create a D-Q-D model from document results 3040 based on IR scores, from click data and other user behavior data derived from the result selection logs 3060, or any combination thereof. The D-Q-D model creation engine 3080 can create and/or updated D-Q-D models offline and online, as described above with regard to FIG. 2.

The information retrieval system 3000 can also include the suggested query creation engine 3090, similar to the suggested query creation engine 2080 described above with regard to FIG. 2. The suggested query creation engine 3090 receives the document results 3040 for a query and provides suggested queries for at least some of the results. The queries suggested by the suggested query creation engine 3090 provide queries that will produce results that are related yet different than the results 3040, such as books in a library that are located near a book identified in a search. The suggested query creation engine 3090 identifies queries that will produce related yet different results using any of a variety of data structures modeling relationships among queries and documents, such as a D-Q-D model produced by the D-Q-D model creation engine 3080.

As described above with regard to the suggested query creation engine 2080, the suggested query creation engine 3090 can provide suggested queries in parallel on a per-result basis, which can later be merged and filtered before presentation to a user.

The components shown in FIG. 3 can be combined in various manners and implemented in various system configurations. For example, the scoring engine 3020 and the ranking engine 3030 can be merged into a single ranking engine, such as the ranking engine 2052 of FIG. 2. The rank modifier engine 3070 and the ranking engine 3030 can also be merged, and in general, a ranking engine includes any software component that generates a ranking of document results after a query. Moreover, a ranking engine can be included in a client system in addition to (or rather than) in a server system. The D-Q-D model creation engine 3080 and the suggested query creation engine 3090 can additionally be merged into a single query suggestion engine, such as the query suggestion engine 1010 described with regard to FIGS. 1A-B.

Although queries have been described as being relevant to documents based on the query in question having been associated with the document through an actual user query and search results page, other techniques can be used to determine whether a query is relevant to a document and/or whether a document is relevant to a query. Queries and documents can be associated with each other based on information other than actual user behavior that provides an indication of relevance. Such other information can be used alone or in concert with user behavior data to determine the relevance of queries to documents and/or documents to queries. For example, information retrieval (IR) scoring may be used to associate documents with queries.

Figure 4A:
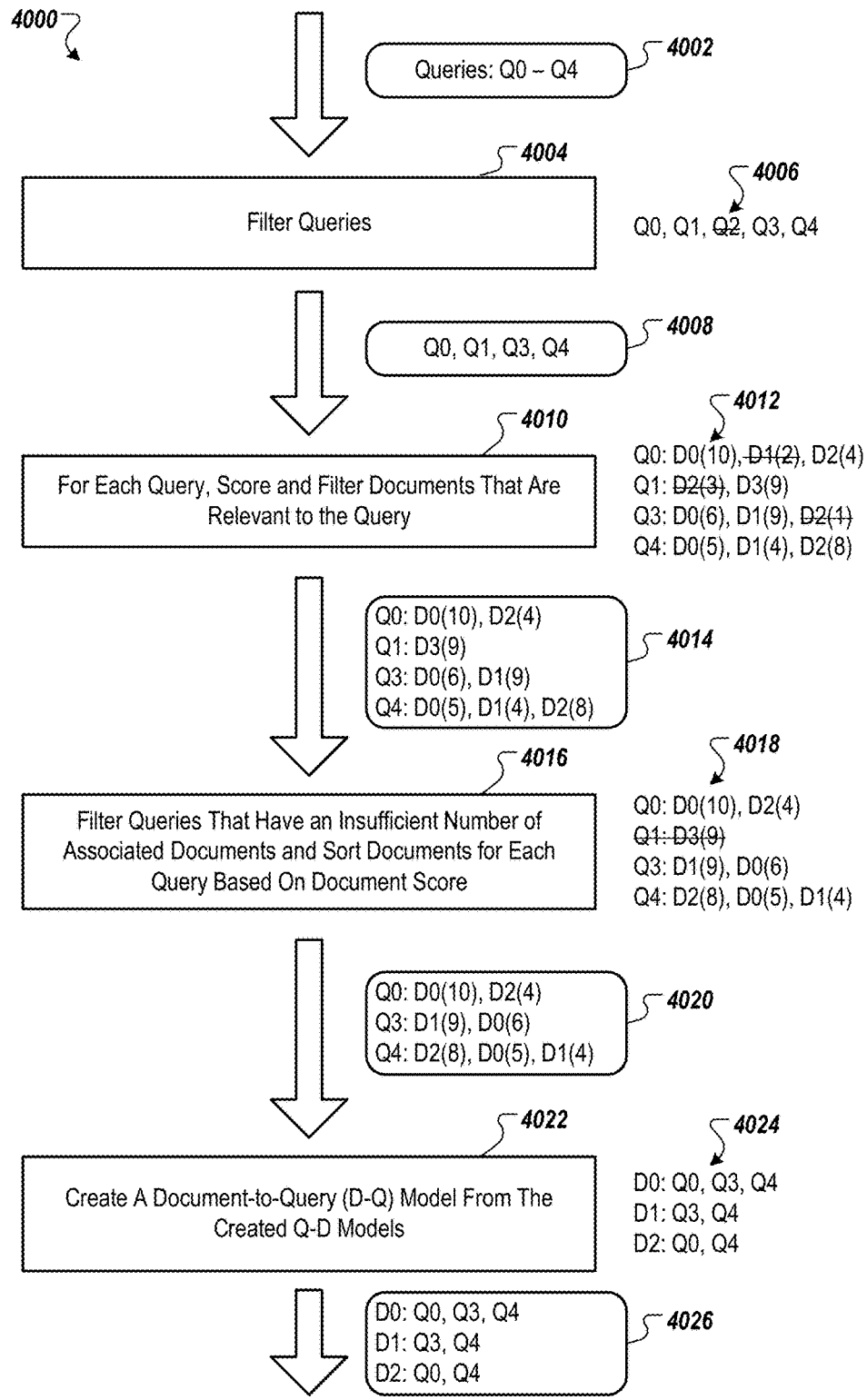
FIGS. 4A-C are diagrams depicting an example technique for creating a D-Q-D model based upon user behavior data for documents and queries.
Figure 4B:
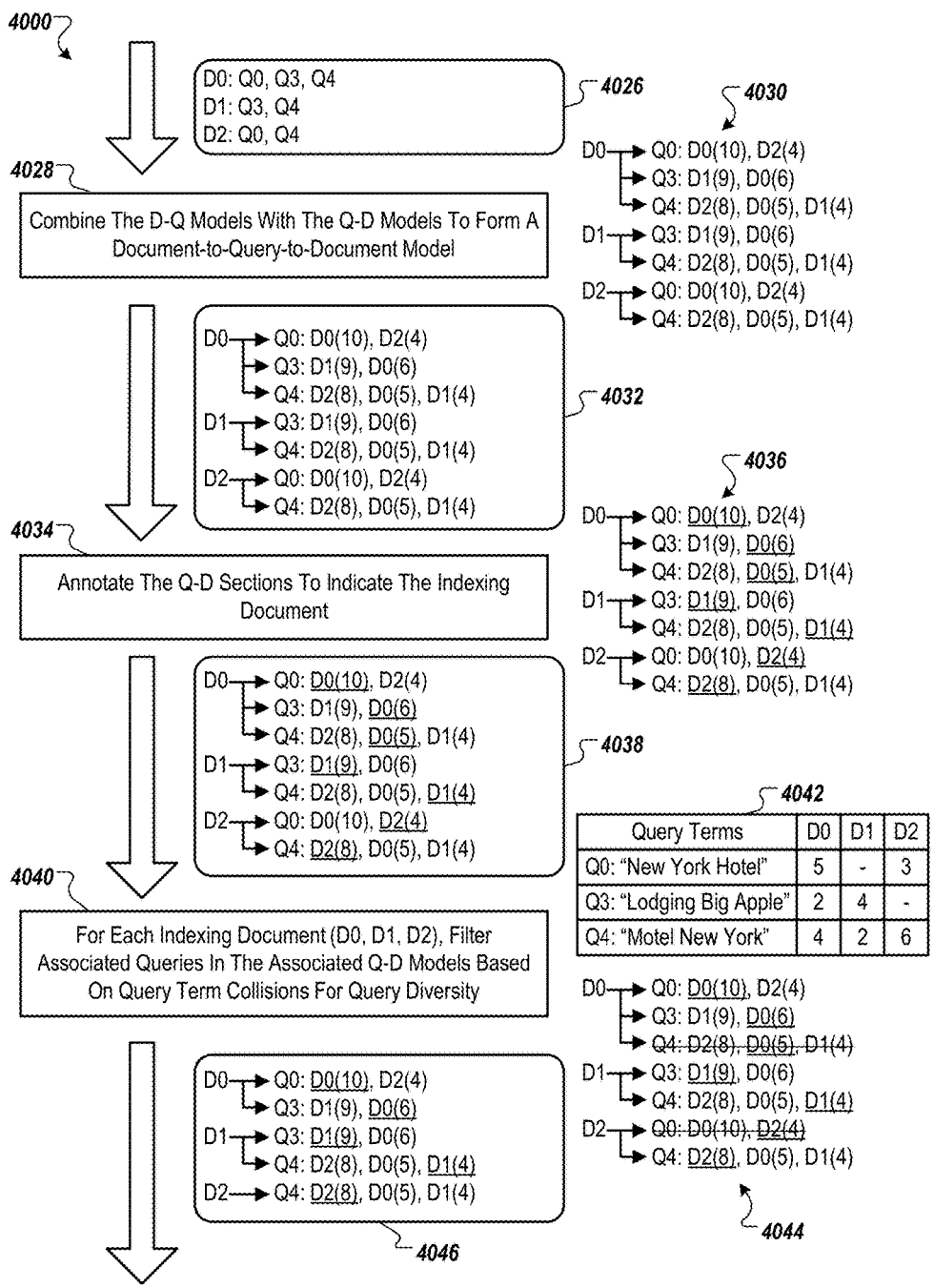
Figure 4C:
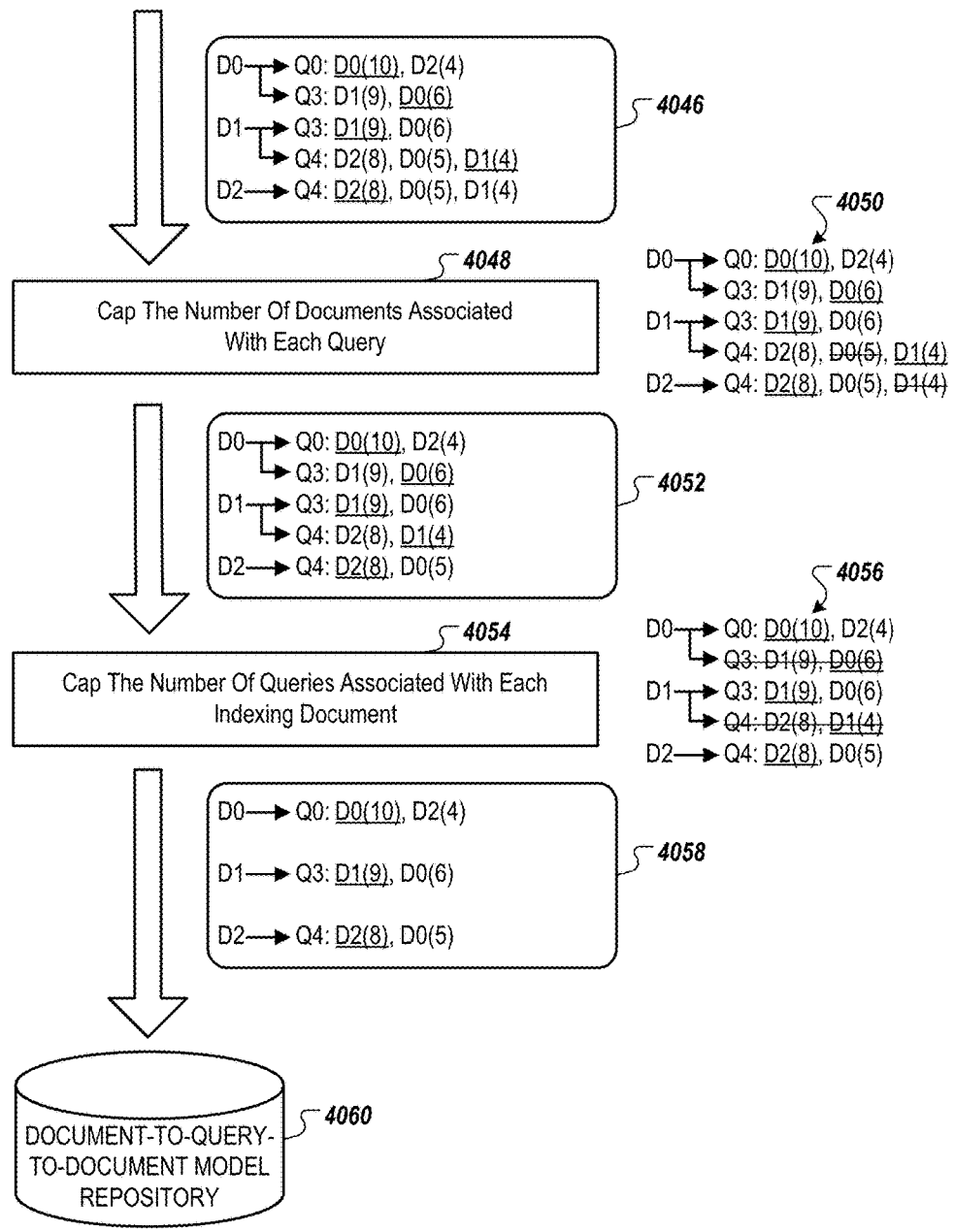

FIGS. 4A-C are diagrams depicting an example technique 4000 for creating a D-Q-D model based upon user behavior data for documents and queries. The technique 4000 depicted in FIGS. 4A-C includes example queries, documents, and user behavior that is presented for illustrative purposes. The technique 4000 can be performed by a variety of systems, for example, by the server system 2070 and its D-Q-D document model creation engine 2078, as described above with reference to FIG. 2, or by the D-Q-D model creation engine 3080, as described above with reference to FIG. 3. Although the example technique 4000 is depicted as creating a D-Q-D model based upon user behavior data, other data that relates documents to queries (e.g., quality of result statistics, IR score, etc.) can be used in the technique 4000 to create a D-Q-D model.

The technique 4000 is directed to producing D-Q-D models that map related documents to each other through queries. Given the vast amount of queries and documents served by a search engine, D-Q-D models mapping document and query relationships can be quite large in size. The technique 4000 provides for the creation of trimmed-down D-Q-D models that are smaller in size yet still contain pertinent document and query relationships for determining suggested queries. Such trimmed-down D-Q-D models provide a number of advantages, such as enabling results with suggested queries to be more quickly provided to a client (e.g., D-Q-D model can be more quickly read into memory, fewer queries and documents to consider for suggested queries, etc.) and reducing the required storage space for D-Q-D models.

The technique 4000 begins at step 4002 by filtering a starting set of queries Q0-Q4 4004 that are being considered for use in creating the D-Q-D model. The starting set of queries Q0-Q4 4004 can be input to the technique 4000 off-line (e.g., a regularly scheduled process to create D-Q-D models) or on-line (e.g., serving a received input query). Filtering of the starting set of queries Q0-Q4 is performed to discard queries that may not be desirable to provide as suggested queries to a user. Such filtering of queries can reduce the size of D-Q-D models that will be created by the technique 4000 and can save processing cycles for both creating and using D-Q-D models (e.g., fewer queries to relate to documents, fewer queries to consider as suggested queries, etc.).

A variety of criteria can be used to filter queries. In a first example criteria, queries that have a special internal search engine encoding and/or result restrictions are filtered-out. For example, in such implementations the query "water site:greenpeace.org" is filtered-out based upon the query being restricted to the greenpeace.org site. In a second example criteria, queries that include a uniform resource locators (URL) (e.g., "www.whitehouse.gov president") or that are url-like (e.g., "www whitehouse gov president") are filtered-out. In a third example criteria, queries that are determined to be too long (e.g., too many characters) to present well as a suggested query to a user are filtered-out. Determining whether a query is too long can be based upon the length of the display line in the results where suggested queries are to be displayed (e.g., a query is too long if it has a length greater than the length of the display line, a query is too long if it has a length greater than half the length of the display line, etc.). The length of the display line can vary, depending on the type of device to which the results are being provided (e.g., desktop computer, laptop computer, mobile phone, etc.). For example, if the length of the display line for suggested queries is determined to be 25, 30, 50, 60, 75, 90, 100, 200, etc. characters, then the maximum length for queries can be the length of the display line or any fraction thereof.

In a fourth example criteria, queries that have terms that are unappealing (e.g., swear words, adult content terms, offensive terms, etc.) to users or that have terms which are likely to be typos (e.g., "ww," etc.) are filtered. Unappealing terms can be identified by referencing a variety of sources that indicate a term is likely to be unappealing to a user, such as a blacklist of terms. In a fifth example criteria, queries with user behavior data and/or quality of result statistics across all documents that is below a minimum threshold are filtered-out. User behavior data and/or quality of result statistics across all documents that are below a minimum threshold for a query can indicate that users do not find the provided results to be particularly relevant to the query. Such queries can be undesirable to provide as a suggested query. For example, queries having an average click weight across all documents that is below a minimum average per-document click weight threshold are filtered-out. Any combination of the example query filtering criteria described above can be used to filter out queries at step 4002. Additional criteria are also possible.

As depicted, application of the filtering queries step 4002 to the example queries Q0-Q4 4004 results in the query Q2 being filtered-out (as indicated by the strike-through) and the queries Q0, Q1, Q3, and Q4 remaining in consideration (4006). In this example, the terms of query Q2 met any one of the five filtering criteria described above.

For each of the filtered queries Q0, Q1, Q3, and Q4 (4008), documents that are relevant to the query are scored and filtered (step 4010). As described above, document relevance to a query can be based upon a variety of relevance indicators, such as document content in relation to a query (e.g., IR score), user interaction with documents presented in results to a query (e.g., user behavior data, quality of result statistics, etc.), and other measures of document relevance. Documents that do not meet a minimum threshold of relevance for a query can be initially filtered. For example, documents that are relevant to a query but which do not have at least a threshold IR score or a threshold number of weighted clicks (document clicks weighted by the duration for which users viewed the documents) are filtered. Such filtering can eliminate documents that are not likely to determine a suggested query, which reduces the D-Q-D model size and saves processing time when creating a D-Q-D model.

Further at step 4010, the documents having at least a minimum degree of relevance to a query are scored. Documents are scored such that a document that is the most relevant to a query receives the greatest score and a document that is the least relevant to the query receives the lowest score. Scoring can be based upon a variety of factors, such as IR score; user behavior data (e.g., number of impressions, number of weighted clicks, etc.); language of the query and document; language of the country from which the query, document, user behavior data originated; etc. Separate D-Q-D models can be created for different languages and/or different countries. For example, a document that is more relevant as a result to a query to users from country A than to users from country B can receive a greater score when creating a D-Q-D model for country A than when creating a D-Q-D model for country B. In some implementations, the score is similar to a quality of result statistic for a document.

Although separate models can be used for different languages and/or geographic regions (e.g, countries, states, continents, etc.), such separate models can be merged into one or more combined models. Such combined models can be used to provide some or all of the suggested queries for a set of search results to a user.

Based upon the score assigned to each document, the documents are filtered and documents that do not have at least a minimum score are removed from consideration. The threshold for filtering documents based upon score can vary depending on a variety of factors, such as scoring technique used, country, language, percentile of document scores across some or all of the queries (e.g., documents having the bottom 5%, 10%, 20%, 25%, 33%, 50%, etc. scores are filtered out), etc. The same score threshold for filtering documents can be used across all queries such that the number of remaining associated with each query provides a metric by which queries can be compared and filtered.

In some implementations, documents are filtered based whether a particular fraction of the total score for a query has been met. Documents can be allowed into a Q-D model in decreasing score order for the query until a fraction (e.g., 20%, 40%, 50%, 66%, etc.) of the total score for the query has been added to the model. For example, given a Q-D model for Q0 that includes D0-D3 with corresponding scores 6, 5, 4, and 3, respectively, the total score for the query is 18 (6+5+4+3). If the fraction used for filtering documents is 50%, then documents D0 and D1 can be allowed into the model for Q0 and can be used to consider whether Q0 will offer anything new to the user. This filtering can be asymmetrically applied to documents the offer something new to a user and to documents that trigger the query suggestion process. For instance, this filtering can be applied to documents in the D-Q-D model that will potentially offer something new to a user and not to documents that trigger the query suggestion process. For instance, even though the documents D2 and D3 were filtered-out of the Q0 model, they can still be in the D-Q portion of the D-Q-D model in the sense that they can trigger a query suggestion process but not in the Q-D portion of the model. For instance, the D-Q-D model in this example can include the following:

D0→Q0→D0, D1
D1→Q0→D0, D1
D2→Q0→D0, D1
D3→Q0→D0, D1

In the above example, the documents D2 and D3 can trigger query suggestions, but are not considered with regard to whether Q0 will offer new documents to a user when identifying suggested queries (D2 and D3 are not included in the Q-D portion of the D-Q-D model). Such a filtering technique can provide improve both recall and precision with regard to query suggestions.

An example group of documents is shown as being associated with queries Q0, Q1, Q3, and Q4 (4012). For example, the documents D0, D1, and D2 are relevant to the query Q0. For illustrative purposes, each of the documents has received a score ranging from 1-10 (any range of scores is possible, such as 0.0 –1.0, 0 –100, –10 –10, etc.). In this example, documents that have a score less than four (4) are filtered. For example, the document D1 associated with query Q0 is filtered. Although only a few documents are shown as being relevant to each query in this example, the number of documents associated with each query is generally much greater. As depicted, a document can be relevant to more than one query (e.g., document D0 is relevant to queries Q0, Q3, and Q4). The score for a document varies depending on the query to which it is associated (e.g., document D0 has a score of ten (10) for query Q0, a score of six (6) for query Q3, and a score of five (5) for query Q4).

Using the scored and filtered Q-D models 4014, queries for which there are an insufficient number of associated documents are filtered and, of the remaining queries, the documents associated with each query are sorted by score (step 4016). For a Q-D model, a query that does not have a threshold number of associated documents can be undesirable to provide as a suggested query. For instance, less than a threshold number of documents being associated with a query can indicate that the query is obscure (e.g., users infrequently enter the query, etc.) and/or that users have not found the provided results to be particularly relevant to the query (e.g., users infrequently click on documents provided in the results). The threshold number of documents can vary depending on a number of factors, such as country, language, empirical data (e.g., tested threshold levels, etc.), percentile of documents associated with queries (e.g., queries that are in the bottom 5%, 10%, 20%, 25%, 33%, 50%, etc. of queries based upon the number of associated documents are filtered-out), etc. Eliminating documents using the discussed filter and threshold techniques can make it more difficult for users aware of the methodology to manipulate query suggestions.

As provided for illustrative purposes, application the step 4016 to the Q-D models 4014 results in the Q-D models 4018. In this example, a Q-D model associated with less than two documents is filtered. For instance, the Q-D model for query Q1 is filtered-out since, after application of step 4010, it is associated with less than two documents. Documents for the remaining Q-D models are sorted based upon their score (e.g., document D1 is ordered ahead of document D0 for query Q3).

The filtered and sorted Q-D models 4020 are used to create a D-Q model (step 4022). A D-Q model inverts the Q-D models so that, instead of documents being associated with queries (as done in the Q-D models), queries are associated with documents. As depicted in example D-Q models 4024, queries Q0, Q3, and Q4 are associated with documents D0, D1, and D2 according to the associations of the Q-D models 4020. For instance, the queries Q0, Q3, and Q4 are associated with the document D0.

Referring to FIG. 4B, a D-Q-D model is created by combining the created D-Q models 4026 and Q-D models 4020. The corresponding Q-D model is appended to each query of a D-Q model. As depicted in the example D-Q-D model 4030, the document D0 is associated with three Q-D models for queries Q0, Q3, and Q4. Such a D-Q-D model relates documents to other documents through queries. For instance, the document D0 is depicted as being related to the document D1 through query Q3. The indexing document (the document from the D-Q section of the D-Q-D model) is contained in each associated Q-D section of the D-Q-D model. For instance, document D0 is associated to itself through each of the queries Q0, Q3, and Q4. The presence and score of an indexing document in its associated Q-D sections can be used for a variety of purposes, such as ranking queries associated with the indexing document during serving of an input query using the D-Q-D model, as explained in further detail below.

Using the D-Q-D model 4032, the Q-D sections of the D-Q-D model are annotated to indicate the indexing document (step 4034). For instance, as shown in the example D-Q-D model 4036, the document D0 is underlined in each Q-D section associated with the indexing document D0. A document within the D-Q-D model can be annotated in a variety of ways, such as appending a special character to the document name, using a bit-flag that is associated with the document, etc. Annotations can be used to increase efficiency with regard to identifying the indexing document within the Q-D sections. This can decrease the processing time taken to determine suggested queries to provide with results when serving an input query.

Using the annotated D-Q-D model 4038, the queries associated with each of the indexing documents are filtered based upon query term collisions (step 4040). Queries are filtered so that, of the queries associated with each indexing document, there is query term diversity. For instance, the queries "running shoe" and "running shoes" provide less query term diversity than the queries "running shoe" and "jogging footwear." Query terms collide if they are sufficiently similar that they are considered essentially the same term. A variety of known algorithms and data sources, such as edit distance, synonym, spelling, and word morphology, can be used to determine query term collisions. Query terms can be considered unigrams (a string of characters without a break character (e.g., space, hyphen, return, etc.)), bigrams (a string of characters with one break character), trigrams (a string of characters with two break characters), etc. Using edit distance in combination with considering terms that are greater than unigrams (e.g., bigrams, trigrams, etc.) can catch minor typographical errors (e.g., "running shoe" and "running sheo," "running shoe" and "runnin gshoe") and terms in that are in a different order (e.g., "shoe running" and "running shoe").

For each indexing document, the terms of the queries associated with the indexing document are analyzed for term collisions. When a term collision is found, the query and/or query term having the greatest weight remains and the other colliding terms are eliminated. After all of the terms of the queries have been evaluated for collisions, the queries are evaluated to determine which queries should be filtered. In various implementations, any query that has had a term eliminated during the collision analysis is filtered-out (removed from the D-Q-D model for the indexing document being evaluated). In other implementations, queries for which all of the terms have been eliminated during the collision analysis are filtered-out. In yet other implementations, queries with more than a threshold number (e.g., more than one term, more than two terms, etc.) or percentage (e.g., more than 25% of the terms, more than 33% of the terms, more than 50% of the terms, etc.) of terms that have been eliminated are filtered-out.

Weights used to determine which terms are eliminated when a collision is detected can be based upon a variety of factors, such as IR score, user behavior data, click weight, etc. Weight can be a measure of how relevant a query is to a document. For example, given a document regarding an online running shoe store, a first query "running shoes" can have a greater weight than a second query "marathon training schedule." The weight for a query term is based upon the weight for the query from which the term is derived. For instance, if the query "running shoes" has a weight of 5, then a weight for each of the terms "running" and "shoes" can be 5 (or some fraction or multiple thereof). In some implementations, the weight for a query term is the combined (e.g., aggregate, multiplied, averaged, etc.) weight for all queries associated with the indexing document that contain the query term. For example, if a first query "running shoes" has a weight of 5 and a second query "running socks" has a weight of 3 for an indexing document, then the weight of the term "running" can be 8 (5+3=8), the weight of the term "shoes" can be 5, and the weight of the term "socks" can be 3.

Referring to table 4042 containing example query terms for the queries Q0, Q3, and Q4, example weights are provided for each of the queries and for each of the indexing documents D0, D1, and D2. For instance, the query Q0 is depicted as "New York Hotel" and the weight for indexing documents D0 and D6 is 5 and 3, respectively (example weights are provided—a variety of weight ranges can be used). For the indexing document D0, the terms of queries Q0, Q3, and Q4 are evaluated for collisions. The term "New York" (with a term being a bigram) collides for queries Q0 and Q4. Additionally, the term "Hotel" from Q0 collides with the term "Motel" from Q4 using Edit Distance (the character 'H' can be replaced with an 'M' in one step to form "Motel"). In this example, one omission, insertion, or inversion (or less) is determined to be a collision and larger deviations are non-collisions. Given that the example weight for Q0 is greater than the example weight for Q4 (5>4) for the indexing document D0, the colliding terms of Q4 ("Motel" and "New York") are eliminated. The query Q4 is compared to a filtering threshold (e.g., filter a query if one or more terms are eliminated, filter a query if all terms are eliminated, etc.) and is filtered-out of the D-Q-D model for the indexing document D0. As depicted in an example D-Q-D model 4044, the Q-D section for query Q4 is filtered-out of the D-Q-D model 4044 based upon the detected collisions. No queries are filtered for the indexing document D1 at step 4040 since no collisions are detected between the associated queries Q3 and Q4. The Q-D section for query Q0 is filtered-out of the D-Q-D model 4044 for the indexing document D2 based upon collisions between the terms of queries Q0 and Q4, and the query Q4 having a greater weight associated with the indexing document D2 than the query Q0 (weight 6>weight 3).

A D-Q-D model 4046 results from the performance of step 4040. The D-Q-D model 4046 has a set of distinct queries associated with each of the indexing documents. Such a distinct set of queries can be used to identify suggested queries that will provide results that are related, yet distinct from the results of an input query during serving (see FIGS. 5A-C).

Referring to FIG. 4C, the number of documents associated with each query in a Q-D section is capped (step 4048). The number of documents in a Q-D section is capped to a threshold number of documents. For example, each Q-D section of the D-Q-D model can be limited to 3, 5, 8, 10, 15, 20, 30, 50, etc. documents. The threshold number of documents can be determined based upon a variety of factors, such as empirical data, available or allotted storage space for each Q-D section, document scores, etc. When there are greater than the threshold number (N) of documents in a Q-D section, the documents for the Q-D section are capped to the documents having the top N scores. The annotated document that corresponds to the indexing document can be included in the documents that are kept for the Q-D section, regardless of whether it is included in the top N scores. Capping the number of documents in each Q-D section can provide a balance between having diverse queries associated with each indexing document (which in turn have diverse document results) and restricting the D-Q-D model to a size that is efficient to use when serving an input query (and providing suggested queries).

Referring to example D-Q-D model 4050 to illustrate step 4048, each Q-D section of the D-Q-D model 4050 is capped to have two documents. Documents for the Q-D sections for query Q4 that are associated with indexing documents D1 and D2 are filtered based upon each of these Q-D sections having more than two documents. Regarding the Q-D section for query Q4 associated with indexing document D1, the document D0 is filtered since it has the lowest score of the non-annotated documents (documents D1 and D2). Regarding the Q-D section for the query Q4 associated with indexing document D2, the document D1 is filtered since it has the lowest score of the non-annotated documents (documents D0 and D1). After filtering the documents D0 and D1 from the Q-D sections for indexing documents D1 and D2, respectively, each Q-D section of the D-Q-D model has two or fewer documents. The D-Q-D model 4052 can result from step 4048. Techniques other than those described in this example can be used for capping. For instance, in some implementations the number of documents is capped and the number of queries is not capped. In some implementations, capping is not used for either documents or queries, but instead the fraction of the total score for a query can be used to filter documents that will be considered to provide something new, as described above.

The number of queries associated with each indexing document of a D-Q-D model is capped (step 4054). The number of queries associated with each indexing document is capped to a threshold number of queries. For example, each indexing document of the D-Q-D model can be limited to 3, 5, 8, 10, 15, 20, 30, 50, etc. queries. The threshold number of queries can be determined based upon a variety of factors, such as empirical data, available or allotted storage space for D-Q-D models, query scores, etc. When there are greater than the threshold number (N) of queries associated with an indexing document, the queries associated with the indexing document are capped to the queries having the top N scores. Query scores can be determined in a variety of manners. In one example, a score for a query is the score of the document from the Q-D section for the query that has the highest score (e.g., the score for query Q0 from D-Q-D model 4052 can be 10). In another example, a score for a query is the score of the document from the Q-D section for the query that has the second (or third, fourth, fifth, lowest, etc.) highest score (e.g., the score for query Q0 from D-Q-D model 4052 can be 4). In a further example, a score for a query is a function of the scores for documents from the Q-D section for the query, such as a function of the highest and lowest document scores, the mean document scores within the Q-D section, the median document score, the aggregate document scores, etc. For example, the score for the query Q0 associated with the indexing document D0 for the D-Q-D model 4052 can be the average of the scores for documents D0 and D2. Other manners of scoring queries are possible. For instance, in some implementations queries are not scored separately in the D-Q-D model, but instead are dynamically scored by the query suggestion engine based on term and/or document diversity.

To illustrate the step 4054, queries in an example D-Q-D model 4056 are capped at one Q-D section being associated with each indexing document. Such a capping scenario is an example that is provided for illustrative purposes. In this example, a query score is the highest document score associated with the query. In this example scenario, the query Q0 has a query score of 10 for the indexing document D0, the query Q3 has a query score of 9 for the indexing document D0 and D1, and the query Q4 has a query score of 8 for the indexing document D1 and D2 (it is possible that the same query will have a different query score for different indexing documents). For the indexing document D0, the query Q3 is filtered out since it has a lower query score than the query Q0 for the document D0. For the indexing document D1, the query Q4 is filtered-out since it has a lower query score than query Q3 for indexing document D1.

The example D-Q-D model 4058 can result from the step 4054. Although the D-Q-D model 4058 depicts each indexing document being associated with one Q-D section, generally an indexing document will be associated with more than one Q-D section.

The D-Q-D model 4058 can be further refined by merging the D-Q-D model with a query-to-query model that maps queries to queries based on variety of associations, such as spelling corrections, suggestions, and/or alternatives. For instance, the query "brittany speres" can be mapped to the query "britney spears," which is the correct spelling of the musician Britney Spears. Such a spelling model can be a query-to-query (Q-Q) model and can be used to check whether a spelling correction is offered for the queries in the D-Q-D model 4058. If a spelling correction for a query is offered, then the score for the corrected query can be checked. If the score for the corrected query is greater than the score for the original query, then the original query can be dropped from the D-Q-D model 4058.

For example, assume that a D-Q-D model contains the following three entries: (1) D0→Q0→D0, D1, D2; (2) D0→Q1→D0, D3, D4; and (3) D0→Q2→D0, D5, D6. Also assume that a Q-Q spelling model contains an entry that indicates that Q2 (e.g., "britney spears") is a corrected spelling for Q1 (e.g., "brittany speres"). If the spelling model is merged with the D-Q-D model, the second entry (D0→Q1 . . . ) and the third entry (D0→Q2 . . . ) in the D-Q-D model can be identified as being associated with redundant queries (e.g., Q1 is misspelled and intended by users as Q2). If the score for the third entry (D0→Q2 . . . ) is greater than the score for the second entry (D0→Q1 . . . ), then the second entry (D0→Q1 . . . ) can be removed from the D-Q-D model for D0. Created D-Q-D models, such as the example D-Q-D model 4058, are stored in a D-Q-D model repository 4060 for use when serving an input query. In some implementations, the created D-Q-D model can be created in response to receiving an input query and, once created, can be used to serve the received input query.

Figure 5A:
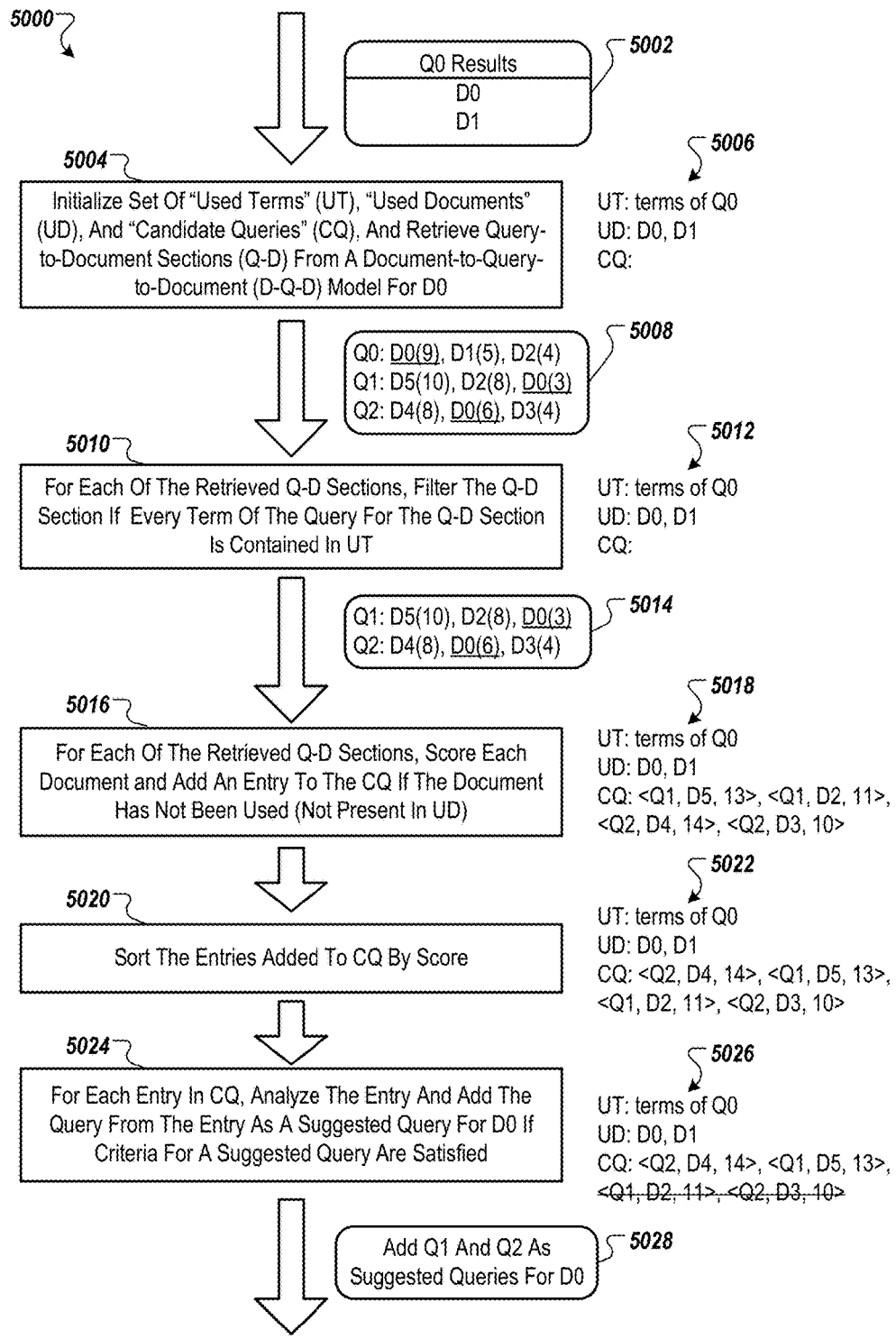
FIGS. 5A-C are diagrams depicting an example technique for providing suggested queries with results to an input query using a D-Q-D model.
Figure 5B:
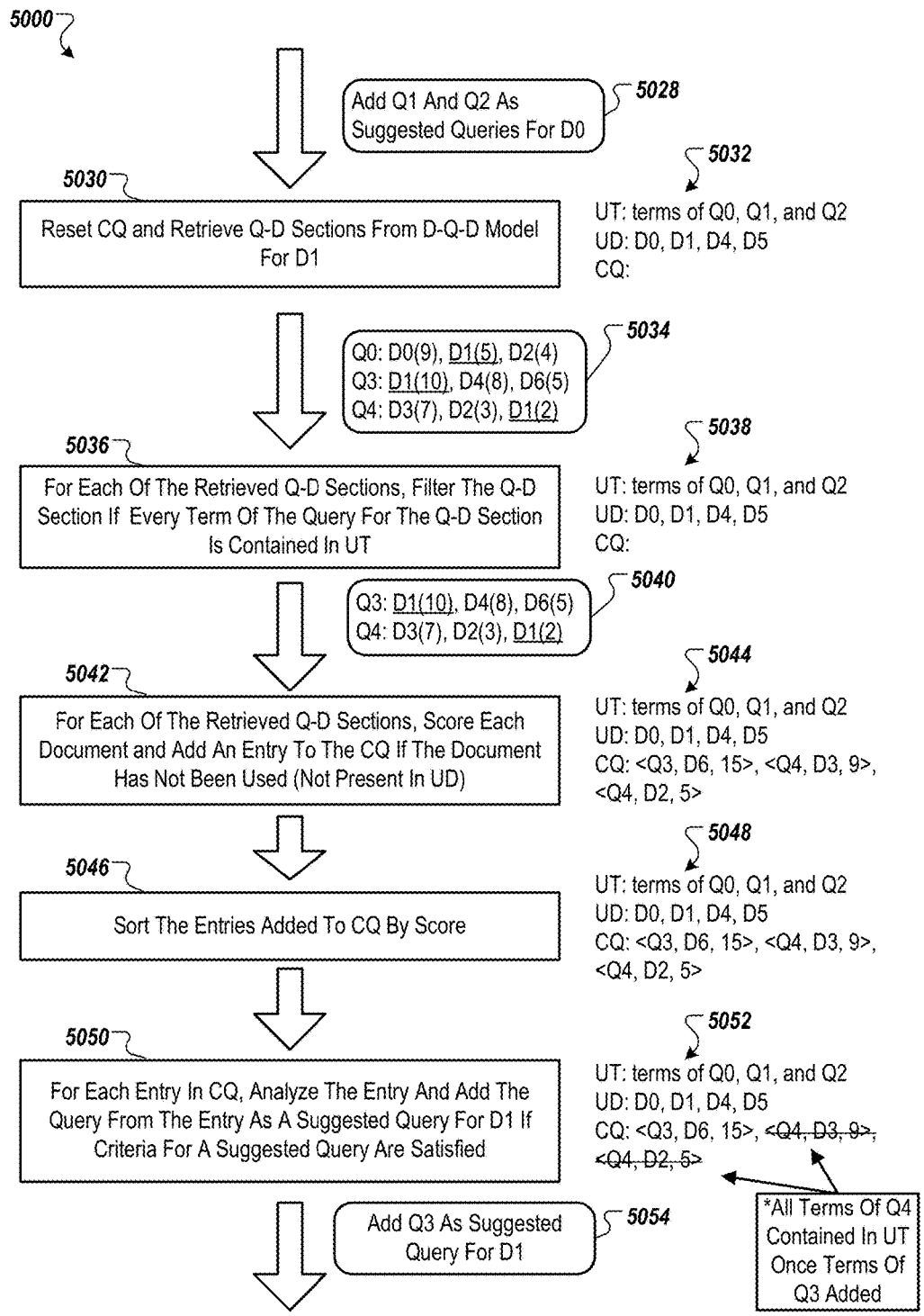
Figure 5C:
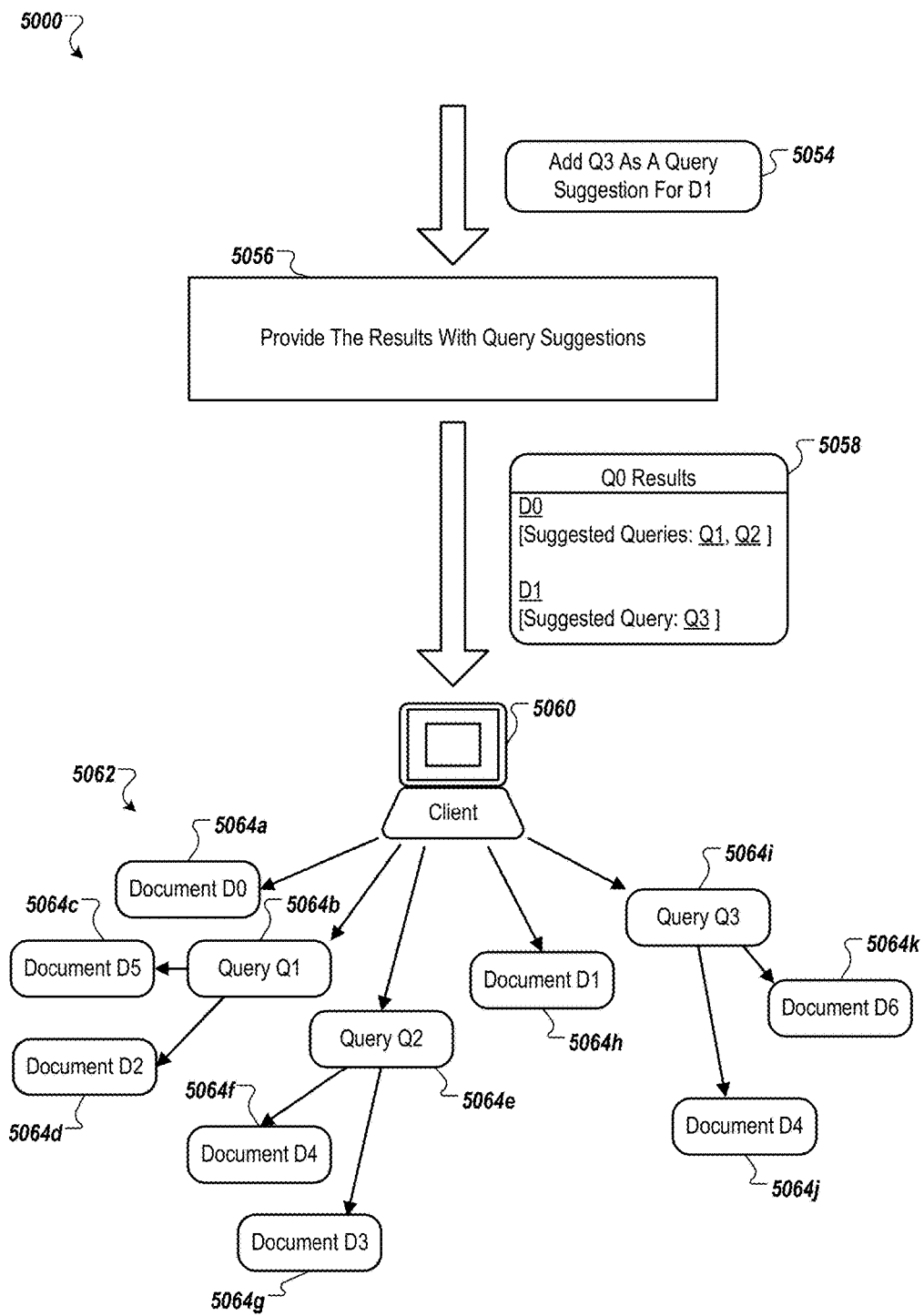

FIGS. 5A-C are diagrams depicting an example technique 5000 for providing suggested queries with results to an input query using a D-Q-D model. The technique 5000 depicted in FIGS. 5A-C includes example queries, documents, and D-Q-D models. The technique 5000 can be performed by a variety of systems, for example, by the server system 2070 and its suggested query creation engine 2080, as described above with reference to FIG. 2, or by the suggested query creation engine 3090, as described above with reference to FIG. 3. The example technique 5000 is depicted as using a D-Q-D model, such as a D-Q-D model created from the technique 4000.

The technique 5000 is directed to providing suggested queries that are diverse from an input query and that will provide results that are diverse from the results for the input query. The technique 5000 uses a D-Q-D model that maps relationships among queries and documents in order to efficiently identify queries to be suggested. The technique 5000 can provide suggested queries based upon other data structures and models that assist in locating related queries and related results.

The technique 5000 begins by receiving results 5002 to an input query. In the depicted example 5002, the documents D0 and D1 are provided as results to an input query Q0. Sets of "used terms" (UT), "used documents" (UD), and "candidate queries" (CQ) are initialized using the received results 5002 (step 5004). The set of UT is populated with the terms of the input query Q0. The terms of the input query Q0 can be added to UT as unigrams, bigrams, etc. The set of UT can additionally be populated with common terms, such as "the," "of," "in," "for," etc. Each of the documents in the results 5002 are added to the set of UD. The set of CQ can be initialized as an empty or null set—CQ is used to store possible suggested queries for later consideration. As depicted, based upon the input query Q0 and the results 5002, UT is initialized to include the terms of the input query Q0 and UD is initialized to include documents D0 and D1 from the results 5002 (5006).

The set of UD can be updated with documents from the original search results dynamically as each of the results is considered. For instance, if the original search results for a query Q0 are D0-D9 (in that order) and the query suggestion engine suggests that D1→Q1→D9, the query Q1 can be considered a relevant suggestion for D1 and not disqualified by D9 (in this example, D9 appears later in the original results page and may not be in the set of UD when a suggested query for D1 is determined). However, if the query suggestion engine suggests that D9→Q2→D1, the query Q2 can be disqualified based on D1 appearing higher in the original search results page (e.g., the document D1 is present in the set of UD when determining a suggested query for D9).

Suggested queries are identified for each of the documents in the results 5002 in the order in which the documents are presented in the results 5002. Starting with document D0 (the first document in the results 5002), a portion of a D-Q-D model for D0 is retrieved (step 5004 further). The indexing document that corresponds to D0 is identified from a D-Q-D model and a set of Q-D sections associated with D0 are returned. The D-Q-D models can be similar to D-Q-D models described above with regard to FIGS. 4A-C. The example Q-D sections 5008 for queries Q0-Q2 are retrieved for the document D0. The Q-D sections 5008 are associated with an indexing document that corresponds to D0 in a D-Q-D model. Similar to the D-Q-D models described above with regard to FIGS. 4A-C, a document corresponding to the indexing document within each Q-D section is annotated (underlined). For example, the document D0 is annotated within the each of the Q-D sections 5008. Such annotations are used to identify queries to suggest for the document D0, as described in further detail below.

For each of the retrieved Q-D sections 5008, the Q-D section is examined and filtered-out if every term of the query for the Q-D section is already contained in UT (step 5010). For example, the Q-D section for the query Q0 is filtered-out since all of the terms for the query Q0 (the input query) are already contained in the set of used terms (UT). By performing such Q-D section filtering based upon the used terms, each remaining Q-D section has a query with at least one term that different than the terms of the input query. Algorithms, such as edit distance, synonymy, spelling, and word morphology, can be used to determine whether a term is contained in the set of used terms. In the example presented, the queries Q1 and Q2 each contain at least one term that is not contained in UT. The Q-D sections 5014 can result from the step 5010 using the used terms and documents 5012. In some implementations, Q-D sections are filtered unless at least a threshold number and/or percentage of terms are found to not be present in UT. For example, a Q-D section can be filtered unless 2, 4, all, etc. terms of a query for the Q-D section are not contained in UT. In another example, a Q-D can be filtered unless 10%, 25%, 50%, 66%, 100%, etc. of the terms of a query for the Q-D section are not contained in UT. In some implementations, term uniqueness (or a threshold degree of term uniqueness) can be examined as a heuristic that, if not satisfied by a proportion of queries (e.g., 0%, 50%, 75%, 100%), can be disregarded and queries the repeat terms can be considered.

For each of the retrieved and filtered Q-D sections 5014, each document from the Q-D section is scored and an entry is added to the candidate queries if the document has not already been used (is not already contained in UD) (step 5016). Scoring at serving time (step 5016) is a function of a score for the indexing document (the annotated document in the Q-D section) and the score for the document being analyzed. For example, when determining a score for the document D5 from the Q-D section for query Q1, the indexing document is D0 with a score of 3 and the document being analyzed is D5 with a score of 10. The scores for each of these documents is retrieved as part of the D-Q-D model. In one example function, the score is the minimum score from the indexing document and the document being analyzed. In another example function, the score is the maximum score from the indexing document and the document being analyzed. In a further example function, the score is a combination (e.g., average, aggregation, weighted average, product, etc.) of the score for the indexing document and the document being analyzed.

In some implementations, whole query scoring can be used (in place of or in addition to step 5016) where the contribution of each document might make is considered when assigning a final score to a query. The scoring for each document can proceed as described above, but these scores are aggregated to derive an overall score for a query. In addition, term uniqueness can be examined as a heuristic that modifies the document-based score for a query based on the uniqueness of the query terms. For instance, instead of filtering out a query for failing to have unique terms, the proportion of unique terms present in a query can be used to adjust the document-based score for the query. For example, if first and second queries have the same document-based score but half of the terms for the first query are unique and none of the terms for the second query are unique, then the resulting score for the first query can be greater than the score for the second query.

Several early-out heuristics can also be applied on a per-query basis so that the same queries are not continually re-examined once they are determined to no longer able to be suggested. Factors such as the minimum scoring threshold for a query and the maximum characters that may be displayed in the user interface may serve to disqualify a query so that it is not considered on subsequent suggestion passes for the same result. As before, selection of a suggested query can result in a reshuffling of the scores for the remaining queries, as the selected query may disqualify its terms and its related documents from consideration.

By considering the score of the indexing document, the strength of the association between the query and the document for which the query will possibly be suggested is taken into account. For instance, in the present example the Q-D sections 5014 are being analyzed to find a query (or queries) to for the document D0 in the results. Based on the scores of the indexing document D0 for queries Q1 and Q2, there is a stronger association between the query Q2 than query Q1 (score of D0 for Q2 is 6 and for Q1 is 3). Given the stronger association with query Q2, there is likely also a stronger association the other documents produced in the results for Q2 (D5 and D2) than for Q1 (D4 and D3). By integrating the score of the indexing document into scores for each of the documents from Q-D sections 5014, such stronger associations can be accounted for and used to select suggested queries for the document D0.

In the depicted example, each of the non-indexing documents (D2-D5) from the Q-D sections 5014 are added to the set of candidate queries (CQ) for the document D0. For this example, the score for a document is determined to be the sum of the indexing document's score and the document's score. For example, the score for document D5 is 13 (score of 10 for D5 plus score of 3 for D0). Entries are added to the set of candidate queries as <query, document, score>. The suggested queries are determined from the set of candidate queries and the associated information (documents, scores) contained therein.

In some implementations, the score is derived from either the indexing document or the score for the document being analyzed. For instance, the score for each document from a Q-D section can be the score of the indexing document (e.g., the score for D5 would be the score of the indexing document D0). In another example, the score for each document from a Q-D section can be the score of the document's score without modification (e.g., the score for D5 would be the score of D5).

With each of the documents analyzed and entries added to the candidate queries for the Q-D sections 5014, the entries added to the set of candidate queries are sorted by score (step 5020). As depicted in the example set of candidate queries 5022, the entry associated with query Q2 and document D4 has the greatest score and the entry associated with query Q2 and document D3 has the lowest score.

Starting at the candidate query entry having the greatest score and moving through the set of candidate queries in descending order, each candidate query entry is analyzed and the query for the entry is added as a suggested query for the document D0 if criteria for a suggested query are satisfied (step 5024). The criteria for a suggested query can include a variety of criteria, such as the query not having been already used as a suggested query, at least one term of the query not being included in UT (at least one distinct term), the document for the entry not being included in UD, the length of the query plus the other suggested queries for the document D0 not exceeding a maximum suggested query line length, etc. If an entry is found to satisfy the criteria for a suggested query, then a user interface (UI) for the displaying the query with the results is constructed. For example, the constructed UI can include text describing the suggested query that contains an anchor and link that, upon a selection by a user, can cause the suggested query to be submitted to the search engine. Additionally, upon determining that an entry satisfies the criteria for a suggested query, the terms of the query from the entry are added to UT, the document of from the entry is added to UD, and the query is marked as used.

Illustrating step 5024 using example UT, UD, and candidate queries 5026, the first entry <Q2, D4, 14> is added as a suggested query for D0 based upon the query Q2 not having been used, at least one of the terms of Q2 not being included in UT, and the document D4 not being included in UD. The query terms for Q2 are added to UT, the document D4 is added to UD, and the query Q2 is marked as "used." The second entry <Q1, D5, 13> is added as a suggested query for D0 based upon the query Q1 not having been used, at least one of the terms of Q1 not being included in UT, and the document D5 not being included in UD. The query terms for Q1 are added to UT, the document D5 is added to UD, and the query Q1 is marked as "used." As indicated by the strike through the entries <Q1, D2, 11> and <Q2, D3, 10>, these entries are not added as suggested queries based upon the queries Q1 and Q2 already having been used. The queries Q1 and Q2 are added as suggested queries for the document D0 (5028).

Referring to FIG. 5B, the steps 5004, 5010, 5016, 5020, and 5024 are repeated for the next document (D1) in the results 5002 for the input query. The set of candidate queries is reset and the Q-D sections from the D-Q-D model for the document D1 from the results 5002 (step 5030). As depicted in the UT, UD, and CQ 5032, the set of used terms (UT) includes the terms of queries Q0 (input query), Q1 (suggested query for D0), and Q2 (suggested query for D0). The set of used documents (UD) includes the document D0-D1 (results 5002) and D4-D5 (distinct results for suggested queries Q1 and Q2). The retrieved Q-D sections 5034 for document D1 include the queries Q0, Q3, and Q4. The indexing document D1 is annotated within each of the Q-D sections 5034.

Similar to the step 5010, the Q-D sections 5034 for which all of the query terms are included in the used terms (UT) are filtered (step 5036). Using the terms in UT 5038, query Q0 is filtered and the queries Q3 and Q4 are not (each query contains at least one term not contained in UT), as depicted in the filtered Q-D sections 5040.

Similar to the step 5016, each document from the filtered Q-D sections 5040 is scored and added to the set of candidate queries (CQ) if the document has not yet been used (is not contained in UD) (step 5042). For the documents from the Q-D sections 5040, entries are added to CQ for documents D6 (query Q3), D3 (query Q4), and D2 (query Q4), as depicted in the example CQ 5044. The other documents (D1 and D4) are already contained in UD. In the depicted example, the same scoring method of aggregating the score of the indexing document with the score of the document being analyzed, as described above with regard to step 5016, is used. For example, the score for document D6 is determined to be 15 (10+5).

The entries added to the CQ are sorted by score (step 5046), as depicted in the example CQ 5048. Similar to step 5024, starting with the entry in CQ 5048 having the greatest score, each of entry in CQ is analyzed and added as a suggested query for document D1 if criteria for a suggested query are satisfied (step 5050). Illustrating step 5046 using example UT, UD, and candidate queries 5052, the first entry <Q3, D6, 15> is added as a suggested query for D1 based upon the query Q3 not having been used, at least one of the terms of Q3 not being included in UT, and the document D6 not being included in UD. The query terms for Q3 are added to UT, the document D6 is added to UD, and the query Q3 is marked as "used." In this example, adding the terms of the query Q3 to UT causes UT to contain all of the terms of query Q4. As such, the queries for entries <Q4, D3, 9> and <Q4, D2, 5> are not added as suggested queries based upon UT containing all of the terms of Q4. Even though the query Q4 has not been used as a suggested query, it can be precluded from use as a suggested query if it does not contain at least one term that is diverse from the set of used query terms. As such, query Q3 is added as a suggested query for document D1 (5054). Adding the query Q3 as a suggested query can include creating a UI for query Q3, as described above.

Referring to FIG. 5C, the suggested queries determined by the technique 5000 are provided with the results 5002 (step 5056). Example results 5058 that include the selected suggested queries Q1 and Q2 for document D0 and query Q3 for document D1 is depicted. Similar to the UI for documents D0 and D1, the UI for the suggested queries can include anchors and links for submitting the suggested query to the search engine, as demonstrated by the suggested queries being underlined. The suggested queries can be presented in a variety of formats, such as in plain text (as depicted in results 5058), in an expandable menu (e.g., drop-down menu), as a hidden feature presented based upon a user providing a particular input (e.g., right click on the document presents suggested queries, shaking mobile device presents suggested queries, etc.), etc.

The results 5058 are provided to a client 5060, such as the clients 2002*a-c* described above with regard to FIG. 2. Using the provided results with suggested queries 5058, the client 5060 can browse to the results to the input query 5002 as well as the related results provided by the suggested queries Q1, Q2, and Q3, as depicted by an example browsing map 5062. Using the results 5058, the client can browse to the documents D0 and D1 (5064*a* and 5064*h*) as well as instruct performance of the suggested queries Q1, Q2, and Q3 (5065*b*, 5065*e*, 5064*i*). In response to receiving a request to perform one of the suggested queries, the client 5060 can receive results that diverge from the original results (D0 and D1). Based on a variety of factors taken into consideration when identifying and providing search results, these divergent results may include the documents D5 5064*c*, D2 5064*d*, D4 5064*f*, D3 5064*g*, and D6 5064*k* that were used in the D-Q-D model to identify queries to suggest to the user. The divergent results may also include documents that were not included in the D-Q-D model.

For example, the client 5060 can browse to documents D0 5064*a* and D1 5064*h* (the results to the input query 5002). Additionally, the client 5060 can browse to documents D5 5064*c*, D2 5064*d*, D4 5064*f*, and D3 5064*g*, which are related to document D0 5064*a*, by using the suggested queries Q1 5064*b* and Q2 5064*e*. For instance, the client 5060 can browse to document D5 5064*c* by selecting the suggested query Q1 from the results 5058. In response to the selecting the suggested query Q1, the client 5060 receives results 5064*b* for the query Q1 that include a selectable link to the document D5 5064*c* (similar to the selectable links to documents D0 and D1 in the results 5058). By selecting this link, the client 5060 browses to the document D5 5064*c*. Instead of being limited to documents D0 5064*a* and D1 5064*h* provided as results to the input query Q0, the suggested queries Q1 5064*b*, Q2 5064*e*, and Q3 5064*i* illuminate to the client 5060 additional related documents D5 5064*c*, D2 5064*d*, D4 5064*f*, D3 5064*g*, and D6 5064*k*. The related documents that are illuminated to the client 5060 can include additional documents in that suggested queries can be provided for each of the documents D5 5064c, D2 5064d, D4 5064f, D3 5064g, and D6 5064k in the results to the suggested queries Q1 5064b, Q2 5064e, and Q3 5064i. The repeated identification and presentation of suggested queries to the client 5060 permits the client to explore a vast assortment of related documents that, without the suggested queries, are otherwise not possible to readily locate.

As mentioned above, suggested queries also serve as a form of documentation, summarization, tagging, and key-wording for their associated results, and may aid the user in more rapidly identifying the relevant result on the original search results page even if the user does not click further on a suggested query link. By clicking on a suggested query, the user and the system can collaborate in the information retrieval task. A suggested query engine system can present information that the user may not know or be aware of, namely, suggested queries that are relevant to the results but which provide additional relevant and diverse information. By selecting a suggested query, the user can provide a search engine and/or suggested query engine system with information about the user's intent as expressed in the user's selection of a suggested query.

Figure 6A:
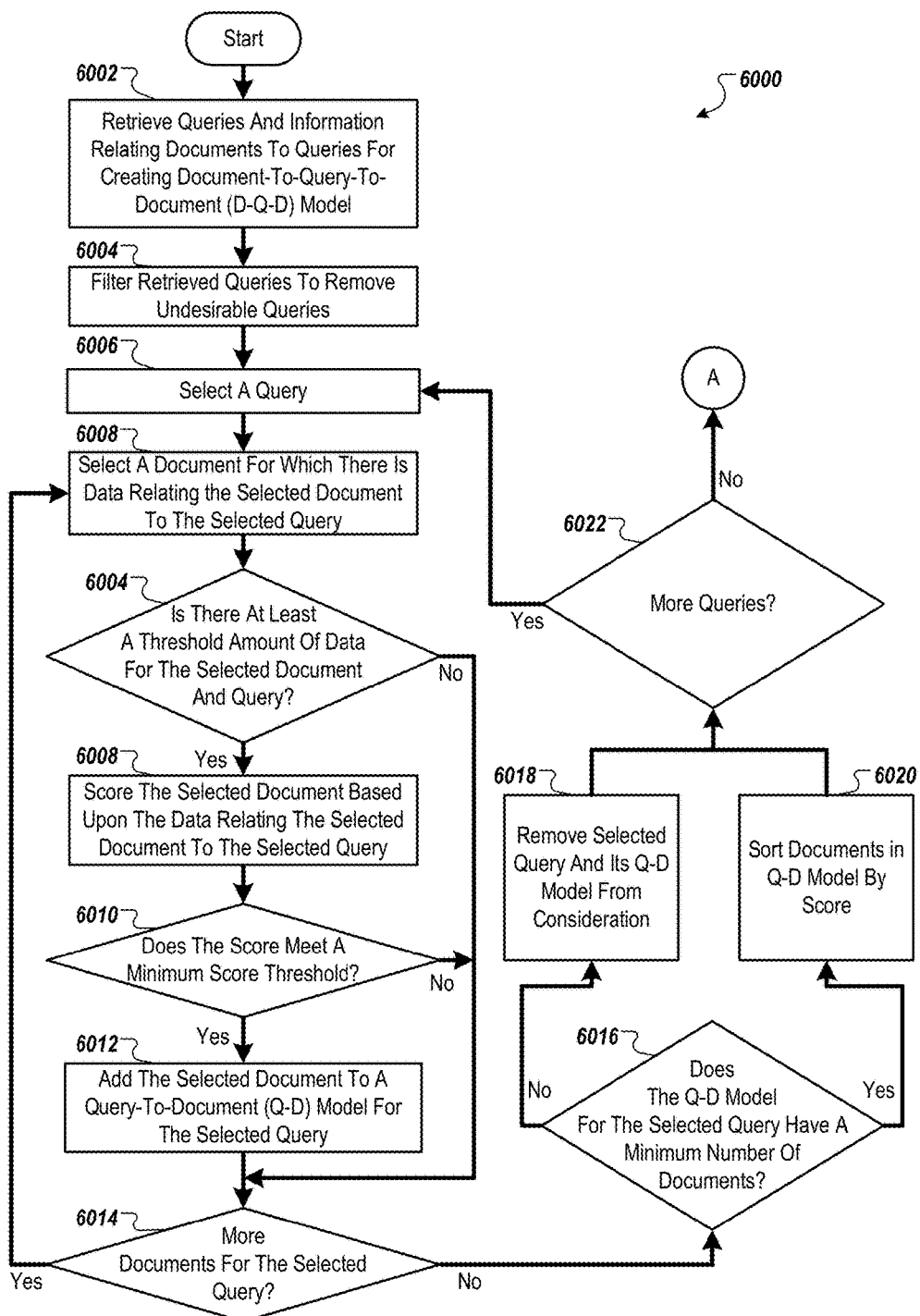
FIGS. 6A-B are flow charts describing an example technique for creating D-Q-D models for use in determining selected queries to provide with results to an input query.
Figure 6B:
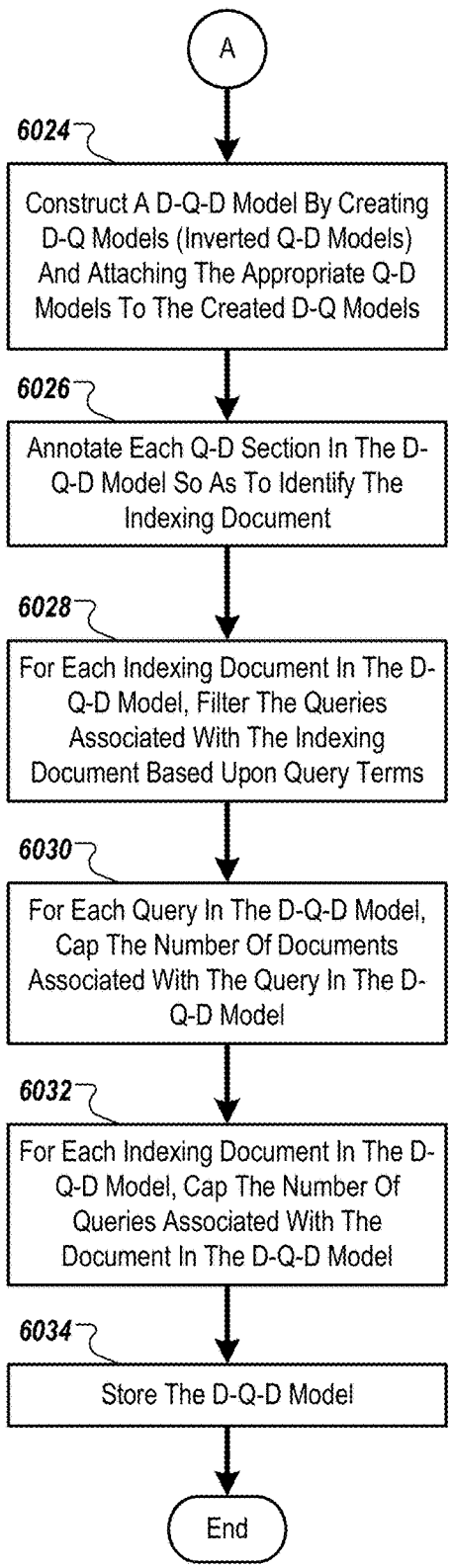

FIGS. 6A-B are flow charts describing an example technique 6000 for creating D-Q-D models for use in determining selected queries to provide with results to an input query. The technique 6000 is similar to the technique 4000 described above with regard to FIGS. 4A-C. The technique 6000 can be performed by a variety of systems, for example, by the server system 2070 and its D-Q-D document model creation engine 2078, as described above with reference to FIG. 2, or by the D-Q-D model creation engine 3080, as described above with reference to FIG. 3.

The technique 6000 begins at step 6002 by retrieving queries and information relating documents to queries for creating a D-Q-D model. The technique 6002 can create a D-Q-D model from a variety of data that indicates which documents are relevant to particular queries, such as user behavior data, quality of result statistics, IR score, etc. Similar to the step 4004 described above with regard to FIG. 4A, the retrieved queries are filtered to remove queries that may be deemed undesirable to present as suggested queries (step 6004). For example, queries that are restricted to particular domains or sites can be filtered.

A query is selected from the filtered queries (step 6006) and a document, for which there is data relating the document to the selected query, is selected (step 6008). A determination is made as to whether there is at least a threshold amount of data (e.g., quantity of user behavior data, a particular IR score, etc.) associated with the selected query and document (step 6004). Similar to step 4010 described above with regard to FIG. 4A, documents for which there is not a sufficient amount of data associated with the selected query are not considered for the D-Q-D model. If there is not a threshold amount of data for the selected document and the selected query, then further analysis of the selected document is skipped and next document is evaluated.

If there is a threshold amount of data, then the selected document is scored based upon the data relating the selected document to the selected query (step 6008). Scoring can be performed in a manner similar to the scoring described above with regard to step 4010 of the technique 4000. The score can be a metric of how relevant the selected document is to the selected query. For example, a first document that is more relevant to the selected query receives a greater score than a second document that is less relevant to the selected query. A determination is made as to whether the score for the selected document meets at least a minimum score threshold (step 6010). If the score does not meet the minimum threshold, then the selected document is not used for creating the D-Q-D model and the next document is considered. If the score does meet the minimum threshold, then the selected document is added to a Q-D model for the selected query (step 6012), similar to the description above with regard to step 4010 from FIG. 4A.

A determination is made as to whether there are more documents that are associated with the selected query (step 6014). If there are more documents, then the steps 6008-6014 are repeated for another document associated with the selected query. The steps 6008-6014 are performed until all of the documents associated with the selected query have been considered for addition to the Q-D model for the selected query. If there are no more documents, then a determination is made as to whether the Q-D model for the selected query has a minimum number of documents (step 6016). The step 6016 is similar to the step 4016 described above with regard to FIG. 4A. If the Q-D model for the selected query does not have a minimum number of documents, then the selected query and its Q-D model are removed from consideration for the D-Q-D model (step 6018). If the Q-D model for the selected query has a minimum number of documents, then the documents included with the Q-D model are sorted based on score (step 6020). A determination is made as to whether there are more queries to consider for the D-Q-D model (step 6022). If there are more queries, then a Q-D model is created and evaluated for each additional query through the steps 6006-6022.

Referring to FIG. 6B, if there are no more queries, then a D-Q-D model is constructed by creating D-Q models (inverted Q-D models) and attaching the appropriate Q-D models to the queries of the created D-Q models (step 6024). For example, the Q-D models associate documents with queries. The D-Q models flip the associations of the Q-D models and associate queries with documents. For example, if documents D0-D4 are associated with a query Q0 by a first Q-D model and with a query Q1 by a second Q-D model, then five D-Q models will be created (one for each document D0-D4) that relates the queries Q0 and Q1 to each of the documents D0-D4. The D-Q models and Q-D models are combined by attaching the Q-D model for Q0 to each instance of the query Q0 in the D-Q models and by doing the same for query Q1. Step 6024 is similar to the steps 4022 and 4028 described above with regard to FIGS. 4A-B.

Similar to step 4034 described above with regard to FIG. 4B, each Q-D section in the created D-Q-D model is annotated so as to identify the indexing document (step 6026). Similar to step 4040, the queries associated with each indexing document are filtered based upon query terms (step 6028). The queries for each indexing document in the D-Q-D model are compared such that queries that a distinct set of queries is associated with each indexing document. For each query in the D-Q-D model, the number of documents associated with the query is capped (step 6030). Step 6030 is similar to step 4048 described above with regard to FIG. 4C. For each indexing document in the D-Q-D model, the number of queries associated with the indexing document is capped (step 6032). Step 6032 is similar to step 4054 described above with regard to FIG. 4C. The steps 6028-6032 can be used to trim the size of the D-Q-D model while maintaining the relationships among sufficiently diverse queries and documents for identifying suggested queries.

The created D-Q-D model is stored (step 6034) for use when serving an input query. The technique 6000 ends after step 6034.

Figure 7:
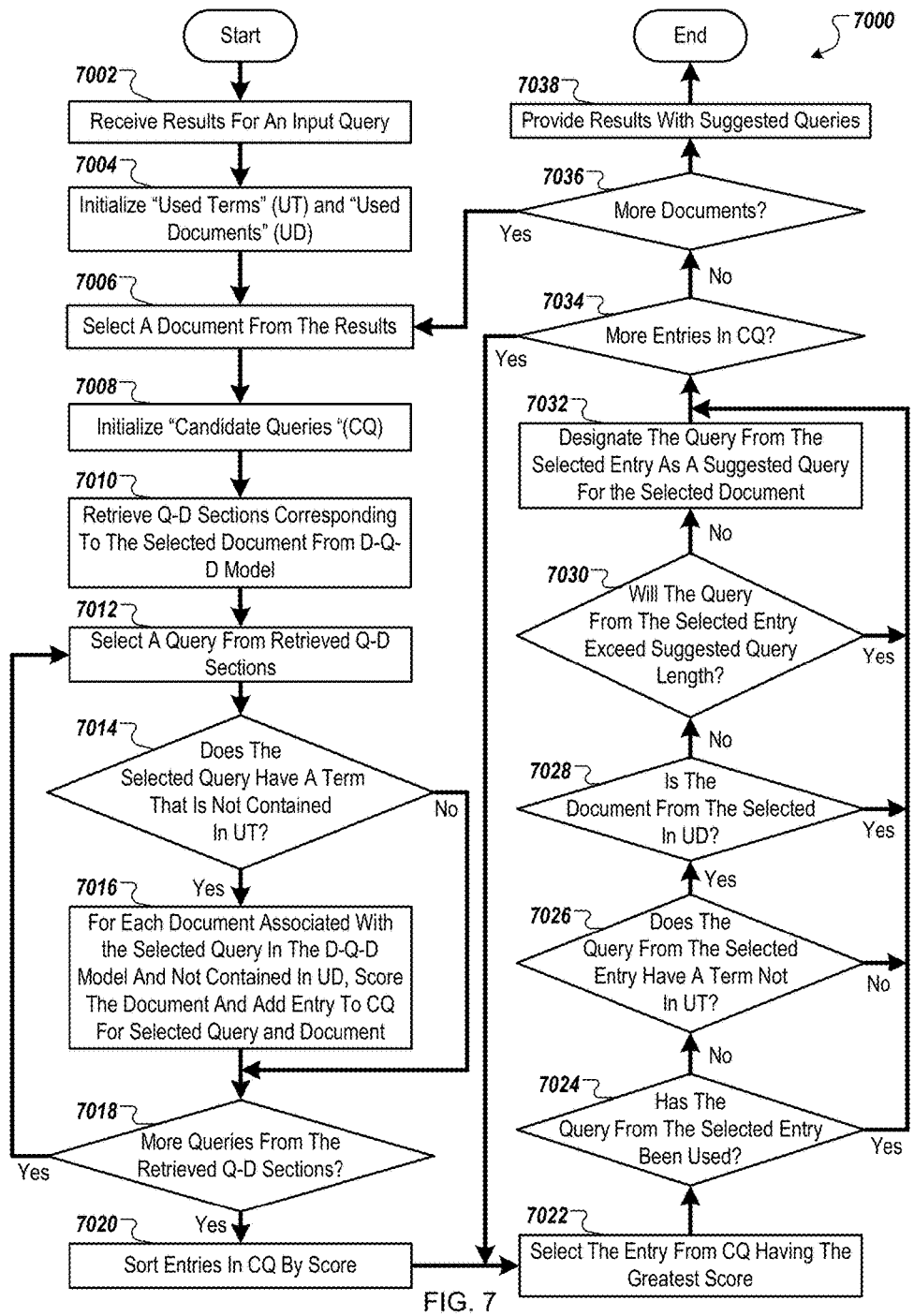
FIG. 7 is a flow chart describing an example technique for providing suggested queries with results to an input query using a D-Q-D model.

FIG. 7 is a flow chart describing an example technique 7000 for providing suggested queries with results to an input query using a D-Q-D model. The technique 7000 can be performed by a variety of systems, for example, by the server system 2070 and its suggested query creation engine 2080, as described above with reference to FIG. 2, or by the suggested query creation engine 3090, as described above with reference to FIG. 3. The example technique 7000 can provide suggested queries using a D-Q-D model, such as the D-Q-D models created by techniques 4000 and 6000.

The technique 7000 beings at step 7002 by receiving results for an input query. The results can be an ordered list of documents produced by a search engine in response to receiving the input query. A set of "used terms" (UT) and a set of "used documents" (UD), which are used to identify diverse queries that produce diverse results, are initialized (step 7004). A document is selected from the received results (step 7006). Suggested queries can be identified for one document at time. The documents can be selected in the order in which they are presented in the results (from highest ranked document to lowest ranked document).

A set of candidate queries is initialized (step 7008) and Q-D sections corresponding to the selected document are retrieved from a D-Q-D model (step 7010), similar to step 5010 described above with regard to FIG. 5A. A query from one of the retrieved Q-D sections is selected (step 7012) and a determination is made as to whether the selected query has a term that is not contained in the set of used terms (UT) (step 7014). If the selected query is not sufficiently diverse from the query terms already used (e.g., the terms for the input query and other queries already selected for suggesting with the results to the input query), then the selected query is not used as a suggested query and other queries from the retrieved Q-D sections are considered. In some implementations, term diversity is a heuristic that used to score a query instead of filtering a query from consideration. In such implementations, the step 7014 may be skipped for some or all queries. For example, if none of the queries associated with a document have a diverse term, then all of the queries may be considered. In another example, step 7014 may not be performed and instead scores for queries may be modified based on term diversity for the query.

If the selected query is sufficiently diverse from the query terms already used, then, for each document associated with the selected query in the Q-D section for the selected query, an entry for the document is added to the set of candidate queries if the document has not already been used (not contained in the set of used documents (UD)) (step 7016). An entry added to the set of candidate queries can include the selected query, the associated document, and a score for the associated document and selected query pair. The score can reflect the relevance of the associated document to the selected query as well as the relevance of the selected query to the selected document from the results. The score can be determined based upon a score for the associated document and/or a score for the selected document from the results, as provided in the Q-D section for the selected query. Scoring can be performed similar to the scoring described above with regard to step 5016 of technique 5000.

As described above, in some implementations that score for a query may additionally be modified based on the diversity of the query's terms. For instance, if a first and a second query have the same document based score and all of the terms of the first query are diverse but none of the terms of the second query are diverse, then the scores for the first and second queries can be modified such that the resulting score for the first query is greater than the resulting score for the second query.

A determination can be made as to whether there are more queries from the retrieved Q-D sections to be considered (step 7018). If there are more queries, then the steps 7012-7018 are repeated for each additional query. Candidate queries identified for each of the other Q-D sections are added to the set of candidate queries. The entries in the set of candidate queries are sorted based upon score (step 7020) and an entry having the greatest score is selected (step 7022).

The selected entry is evaluated in view of example criteria 7024-7030 to determine whether the query from the selected entry should be selected as a suggested query for the selected document. A determination is made as to whether the query from the selected entry has already been used (e.g., used for another suggested query, used as the input query, etc.) (step 7024). If the query has been used, then the next entry in the set of candidate queries is considered. If the query has not been used, then a determination is made as to whether the query from the selected entry has at least one term that has not already been used (at least one diverse term) (step 7026). If the query from the selected entry does not have any diverse terms, then the next entry in the set of candidate queries is considered. If the query from the selected entry does have at least one diverse term, then a determination is made as to whether the document from the selected entry has already been used (whether the document is in the set of used documents) (step 7028). If the document has already been used (e.g., used as an indicator that the results for the query from the selected entry are diverse), then the next entry in the set of candidate queries is considered. If the document has not been used, then a determination is made as to whether adding the query from the selected entry to a suggested query line for the selected document will exceed a maximum length for the line (step 7030). If addition of the query from the selected entry will not exceed the maximum length, then the query from the selected entry is designated as a suggested query for the selected document (step 7032). Designation can include creating a UI for the suggested query, similar to the UI described above with reference to technique 5000. Additionally, the terms of the suggested query can be added to the set of used terms (UT), the document from the selected entry can be added to the set of used documents (UD), and the suggested query can be marked as used.

A determination is made as to whether there are more entries in the set of candidate queries to be considered (step 7034). If there are more entries, then the steps 7022-7034 is performed for each candidate query. If there are no more entries to be considered, then a determination is made as to whether there are more documents in the received results to consider (step 7036). If there are more documents, then the steps 7006-7036 are repeated for each of the additional documents—suggested queries can be identified for each of the documents contained in the received results. If there are no more documents to consider, then the results with suggested queries are provided (step 7038). The results with suggested queries can be provided to a client, such as the client 5060 described above with reference to FIG. 5C. The technique 7000 ends after step 7038.

Figure 8:
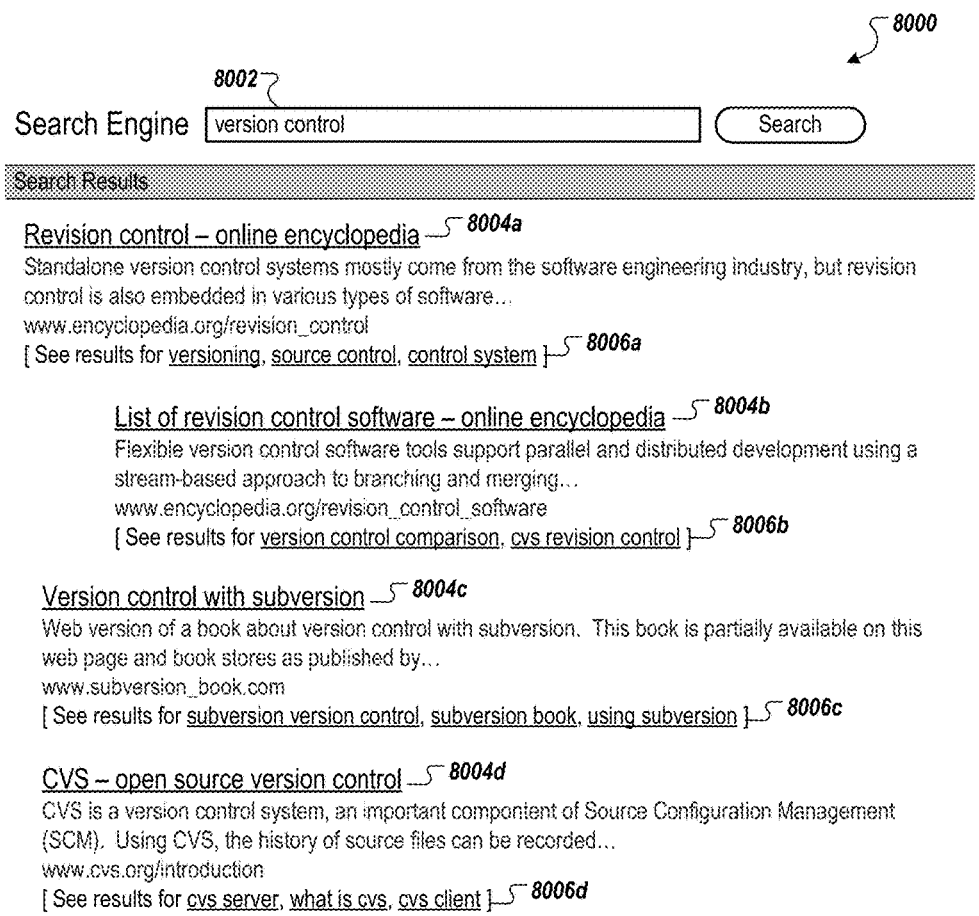
FIG. 8 is a depiction of example query results that are provided with suggested queries.

FIG. 8 is a depiction 8000 of example query results that are provided with suggested queries. The depiction 8000 can be provided by a variety of systems, for example, by the server system 2070 and its suggested query creation engine 2080, as described above with reference to FIG. 2, or by the suggested query creation engine 3090, as described above with reference to FIG. 3. The depiction 8000 can be provided using a variety of techniques to identify diverse queries that will provide diverse results, such as the technique 5000 described above with regard to FIGS. 5A-C and the technique 7000 described above with regard to FIG. 7.

The depiction 8000 includes an example input query 8002 "version control" for which results and suggested queries are provided. Results 8004a-d are provided for the input query 8002. For each of the results 8004a-d, at least one suggested query 8006a-d is provided. Starting with the suggested queries 8006a for the highest ranked document 8004a and moving down the results, each of the suggested queries 8006a-d provides at least one diverse query term that had not previously been provided in the input query 8002 or in one of the suggested queries 8006a-d. The suggested queries 8006a-d are depicted as each being selectable text that, once selected, can cause the suggested query to be submitted to the search engine. The results for each of the suggested queries 8006a-d are diverse from the results 8004a-d. The UI for each of the suggested queries 8006a-d can be provided in a variety of programming languages using a variety of application programming interfaces (APIs) (or combinations thereof). As described above with regard to FIG. 5C, the suggested queries 8006a-d can be hidden and displayed to the user in response to an input (e.g., right click on one of the documents 8004a-d, hover over one of the documents 8004a-d, etc.) or after an elapsed period of time (e.g., user has not selected a document from the results within 15 seconds, 30 seconds, one minute, etc.). Additionally, the UI for the suggested queries 8006a-d can be configured for the particular device (e.g., desktop computer, mobile computing device (e.g., netbook, laptop, etc.), mobile phone, gaming device, etc.) to which the results are being provided. For example, if the suggested queries 8006a-d are provided to a mobile phone, the UI interface can be configured to display the suggested queries 8006a-d by shaking the phone.

The suggested queries can be presented in an area of the UI that is separate from the results with which they are associated. For example, the suggested queries can be aggregated at the bottom, top, or side of the results page. A variety of presentation modes for the suggested queries (and associated information) can also be used, such as changes in font size, color, shape, weight, decoration, layout on the page, and integration with dynamic UI elements (e.g., JavaScript, mouse hovers, touch interfaces, etc.).

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
at a computing system comprising one or more computers, a computer in the one or more computers having a processor and a memory;
obtaining a plurality of search results responsive to an initial search query, the search results including a first search result that identifies a first resource;
determining, using a document-to-query-to-document model that associates the first resource with a plurality of previously submitted queries and associates each of the plurality of previously submitted queries with one or more resources that have been previously identified by search results for the previously submitted query, that the first resource is relevant to a first suggested query of the previously submitted queries different from the initial search query;
generating a presentation of the search results responsive to the initial search query, wherein each search result in the presentation includes a link to a respective resource, wherein the first search result in the presentation includes a link that, upon a selection by a user, causes the first suggested query to be submitted to a search engine; and
providing the presentation of the search results in response to the initial search query.

2. The method of claim 1, wherein the first suggested query includes a first term that does not occur in the initial search query.

3. The method of claim 1, wherein determining, using a document-to-query-to-document model, that the first resource is relevant to a first suggested query different from the initial search query comprises:
obtaining a first plurality of previously submitted search queries, each of the first plurality of previously submitted search queries being associated with the first resource identified by the first search result; and
selecting a first query from the first plurality of previously submitted search queries as the first suggested query, the first query having at least one term that does not occur in the initial search query.

4. The method of claim 3, further comprising: associating the first resource with the first plurality of previously submitted search queries based on user behavior data when the first resource is identified by search results provided to users as responsive to the first plurality of previously submitted search queries.

5. The method of claim 3, wherein selecting a first query from the first plurality of previously submitted search queries as the first suggested query comprises:
determining a respective measure of diversity for each of the first plurality of previously submitted search queries, the respective measure of diversity being based on resources associated with each of the first plurality of previously submitted search queries and resources identified by the plurality of search results responsive to the initial search query; and
selecting a first query having a measure of diversity that satisfies a threshold.

6. The method of claim 1, wherein the first suggested query is associated with search results having an associated measure of diversity with the plurality of search results responsive to the initial query, the measure of diversity satisfying a diversity threshold.

7. A system comprising:
one or more computers and one or more storage devices storing instructions that are operable, when executed by the one or more computers, to cause the one or more computers to perform operations comprising:
obtaining a plurality of search results responsive to an initial search query, the search results including a first search result that identifies a first resource;
determining, using a document-to-query-to-document model that associates the first resource with a plurality of previously submitted queries and associates each of the plurality of previously submitted queries with one or more resources that have been previously identified by search results for the previously submitted query, that the first resource is relevant to a first suggested query of the previously submitted queries different from the initial search query;

generating a presentation of the search results responsive to the initial search query, wherein each search result in the presentation includes a link to a respective resource, wherein the first search result in the presentation includes a link that, upon a selection by a user, causes the first suggested query to be submitted to a search engine; and providing the presentation of the search results in response to the initial search query.

8. The system of claim 7, wherein the first suggested query includes a first term that does not occur in the initial search query.

9. The system of claim 7, wherein determining, using a document-to-query-to-document model, that the first resource is relevant to a first suggested query different from the initial search query comprises:

obtaining a first plurality of previously submitted search queries, each of the first plurality of previously submitted search queries being associated with the first resource identified by the first search result; and selecting a first query from the first plurality of previously submitted search queries as the first suggested query, the first query having at least one term that does not occur in the initial search query.

10. The system of claim 9, the operations further comprising: associating the first resource with the first plurality of previously submitted search queries based on user behavior data when the first resource is identified by search results provided to users as responsive to the first plurality of previously submitted search queries.

11. The system of claim 9, wherein selecting a first query from the first plurality of previously submitted search queries as the first suggested query comprises:

determining a respective measure of diversity for each of the first plurality of previously submitted search queries, the respective measure of diversity being based on resources associated with each of the first plurality of previously submitted search queries and resources identified by the plurality of search results responsive to the initial search query; and selecting a first query having a measure of diversity that satisfies a threshold.

12. The system of claim 7, wherein the first suggested query is associated with search results having an associated measure of diversity with the plurality of search results responsive to the initial query, the measure of diversity satisfying a diversity threshold.

13. A computer program product, encoded on one or more non-transitory computer storage media, comprising instructions that when executed by one or more computers cause the one or more computers to perform operations comprising:

obtaining a plurality of search results responsive to an initial search query, the search results including a first search result that identifies a first resource;

determining, using a document-to-query-to-document model that associates the first resource with a plurality of previously submitted queries and associates each of the plurality of previously submitted queries with one or more resources that have been previously identified by search results for the previously submitted query, that the first resource is relevant to a first suggested query of the previously submitted queries different from the initial search query;

generating a presentation of the search results responsive to the initial search query, wherein each search result in the presentation includes a link to a respective resource, wherein the first search result in the presentation includes a link that, upon a selection by a user, causes the first suggested query to be submitted to a search engine; and providing the presentation of the search results in response to the initial search query.

14. The computer program product of claim 13, wherein the first suggested query includes a first term that does not occur in the initial search query.

15. The computer program product of claim 13, wherein determining, using a document-to-query-to-document model, that the first resource is relevant to a first suggested query different from the initial search query comprises:

obtaining a first plurality of previously submitted search queries, each of the first plurality of previously submitted search queries being associated with the first resource identified by the first search result; and selecting a first query from the first plurality of previously submitted search queries as the first suggested query, the first query having at least one term that does not occur in the initial search query.

16. The computer program product of claim 15, the operations further comprising: associating the first resource with the first plurality of previously submitted search queries based on user behavior data when the first resource is identified by search results provided to users as responsive to the first plurality of previously submitted search queries.

17. The computer program product of claim 15, wherein selecting a first query from the first plurality of previously submitted search queries as the first suggested query comprises:

determining a respective measure of diversity for each of the first plurality of previously submitted search queries, the respective measure of diversity being based on resources associated with each of the first plurality of previously submitted search queries and resources identified by the plurality of search results responsive to the initial search query; and selecting a first query having a measure of diversity that satisfies a threshold.

* * * * *